United States Patent
Kotake et al.

(10) Patent No.: US 8,063,983 B2
(45) Date of Patent: Nov. 22, 2011

(54) IMAGING APPARATUS HAVING A MOVABLE BARRIER AND A MOVABLE BARRIER OPENING/CLOSING MEMBER

(75) Inventors: Ryo Kotake, Kanagawa (JP); Yuji Oikawa, Kanagawa (JP)

(73) Assignee: Sony Corporation (JP)

( * ) Notice: Subject to any disclaimer, the term of this patent is extended or adjusted under 35 U.S.C. 154(b) by 381 days.

(21) Appl. No.: 12/321,191

(22) Filed: Jan. 16, 2009

(65) Prior Publication Data
US 2009/0185066 A1 Jul. 23, 2009

(30) Foreign Application Priority Data

Jan. 18, 2008 (JP) ................................ P2008-009025

(51) Int. Cl.
*H04N 5/225* (2006.01)
*G03B 17/00* (2006.01)

(52) U.S. Cl. .......................... 348/375; 348/376; 396/448
(58) Field of Classification Search .......... 348/375–376; 396/450, 448
See application file for complete search history.

(56) References Cited

U.S. PATENT DOCUMENTS

| 5,819,127 A * | 10/1998 | Yokota ............................ 396/349 |
| 6,637,953 B2 * | 10/2003 | Nakanishi et al. ............ 396/448 |
| 7,578,627 B2 * | 8/2009 | Izumi et al. ................... 396/448 |
| 7,672,584 B2 * | 3/2010 | Ahn ................................ 396/539 |
| 7,868,945 B2 * | 1/2011 | Hong et al. .................... 348/373 |
| 2007/0081820 A1 | 4/2007 | Izumi et al. |

FOREIGN PATENT DOCUMENTS

| JP | 09197480 A | 7/1997 |
| JP | 2001290194 A | 10/2001 |
| JP | 2004236054 A | 8/2004 |
| JP | 2007-108338 A | 4/2007 |
| JP | 2007133014 A | 5/2007 |

OTHER PUBLICATIONS

Office Action from Japanese Application No. 2008-009025, dated Oct. 1, 2009.
Office Action from Chinese Application No. CN 200910001836.2, dated Jun. 9, 2010.

* cited by examiner

*Primary Examiner* — Ngoc-Yen Vu
(74) *Attorney, Agent, or Firm* — Lerner, David, Littenberg, Krumholz & Mentlik, LLP

(57) ABSTRACT

An imaging apparatus is disclosed. The imaging apparatus includes: a housing forming an external armor; an imaging lens provided in the housing; a barrier adapted to be moved between a closing position at which it covers the imaging lens; and an opening position at which it causes the imaging lens, a barrier opening/closing member provided at the housing so as to be movable between a first position and a second position; and an interlock mechanism coupling the barrier and the barrier opening/closing member, causing the barrier to be located at the closing position at the first position of the barrier opening/closing member, and causing the barrier to be located at the opening position at the second position, the barrier being provided between the housing and the barrier opening/closing member and covered, at the opening position, with the barrier opening/closing member located at the second position.

6 Claims, 20 Drawing Sheets

IMAGING APPARATUS HAVING A MOVABLE BARRIER AND A MOVABLE BARRIER OPENING/CLOSING MEMBER

CROSS REFERENCES TO RELATED APPLICATIONS

The present invention contains subject matter related to Japanese Patent Application JP 2008-009025 filed in the Japanese Patent Office on Jan. 18, 2008, the entire contents of which being incorporated herein by reference.

BACKGROUND OF THE INVENTION

1. Field of the Invention

The present invention relates to an imaging apparatus.

2. Description of the Related Art

As an imaging apparatus, such as a digital still camera and the like, there is an imaging apparatus which is provided with a barrier (a lens cover) opening and closing an imaging lens of the imaging apparatus, in order to protect the imaging lens.

As the concrete structure of such an imaging apparatus, there is provided a structure in which an imaging lens is provided at a front surface of a housing forming an external armor of the imaging apparatus, and a plate-shaped barrier is slidingly moved vertically along the front surface, whereby the barrier is movable between a closing position at which it covers the imaging lens, and an opening position at which it causes the imaging lens to be exposed (refer to Japanese Patent Application Laid-Open No. 2007-108338).

SUMMARY OF THE INVENTION

However, in the above-mentioned imaging apparatus, a piece of the barrier is slidingly moved vertically along the front surface of the housing, so that when the barrier is moved to the closing position or the opening position, the lens barrier becomes located at a position displaced upwardly or downwardly relative to an outline of the front surface of the housing, which is disadvantageous in term of obtaining a degree of freedom of a design characteristic.

The present invention has been made in view of such a situation. It is desirable to provide an imaging apparatus which is advantageous in obtaining the degree of freedom of the design characteristic.

According to an embodiment of the present invention, there is provided an imaging apparatus which includes: a housing forming an external armor; an imaging lens provided in the housing; a barrier adapted to be moved between a closing position at which it covers the imaging lens, and an opening position at which it causes the imaging lens to be exposed; a barrier opening/closing member provided at the housing so as to be movable between a first position and a second position; and an interlock mechanism coupling the barrier and the barrier opening/closing member, causing the barrier to be located at the closing position at the first position of the barrier opening/closing member, and causing the barrier to be located at the opening position at the second position, the barrier being provided between the housing and the barrier opening/closing member and covered, at the opening position, with the barrier opening/closing member located at the second position.

According to an embodiment of the present invention, the barrier and the barrier opening/closing member are coupled to each other utilizing the interlock mechanism, whereby the barrier is located at the closing position at which it covers the imaging lens at the first position of the barrier opening/closing member, the barrier is located at the opening position at which it causes the imaging lens to be exposed at the second position, and the barrier at the opening position is covered with the barrier opening/closing member located at the second position, thus making it possible to lay out two components including the barrier and the barrier opening/closing member with respect to the housing, which becomes advantageous in obtaining a degree of freedom of a design characteristic of the imaging apparatus.

BRIEF DESCRIPTION OF THE DRAWINGS

Embodiments of the present invention will be described in detail based on the following figures, wherein.

DETAILED DESCRIPTION OF THE PREFERRED EMBODIMENT

An embodiment of the present invention will be discussed hereinafter with reference to the drawings.

Figure 1:
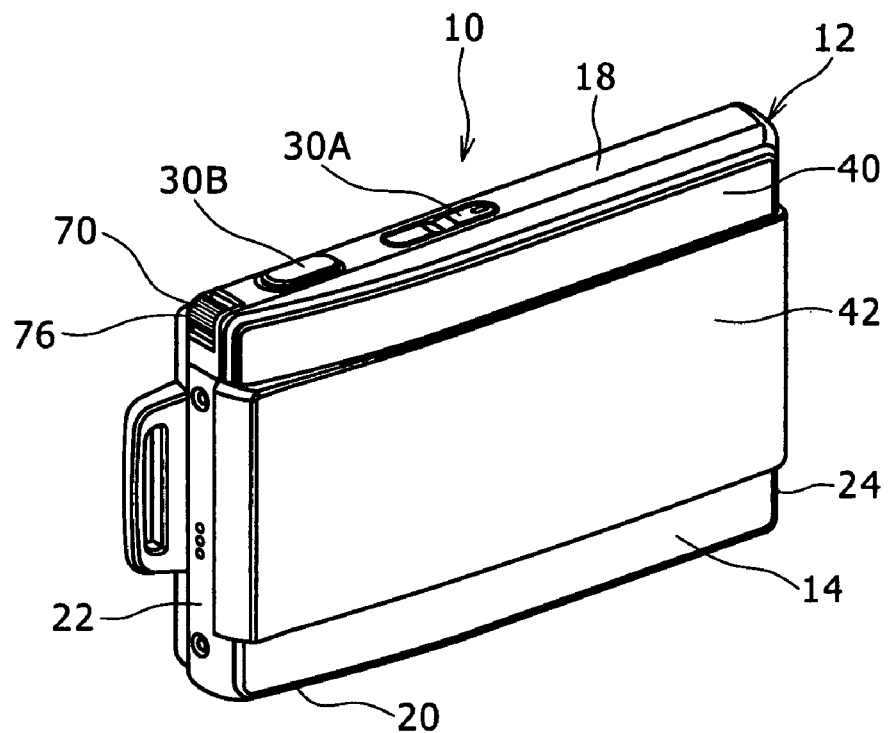
FIG. 1 is a perspective view of an imaging apparatus according to an embodiment of the present invention, in which a condition where a barrier of the imaging apparatus is located at a closing position is shown.
Figure 2:
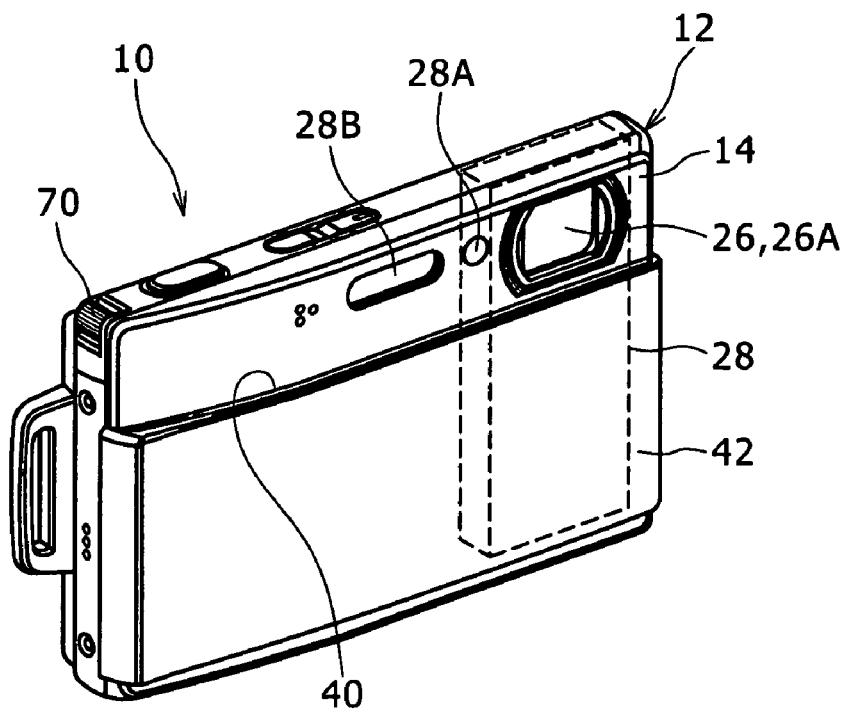
FIG. 2 is a perspective view of the imaging apparatus, in which a condition where the barrier of the imaging apparatus is located at an opening position is shown.
Figure 3:
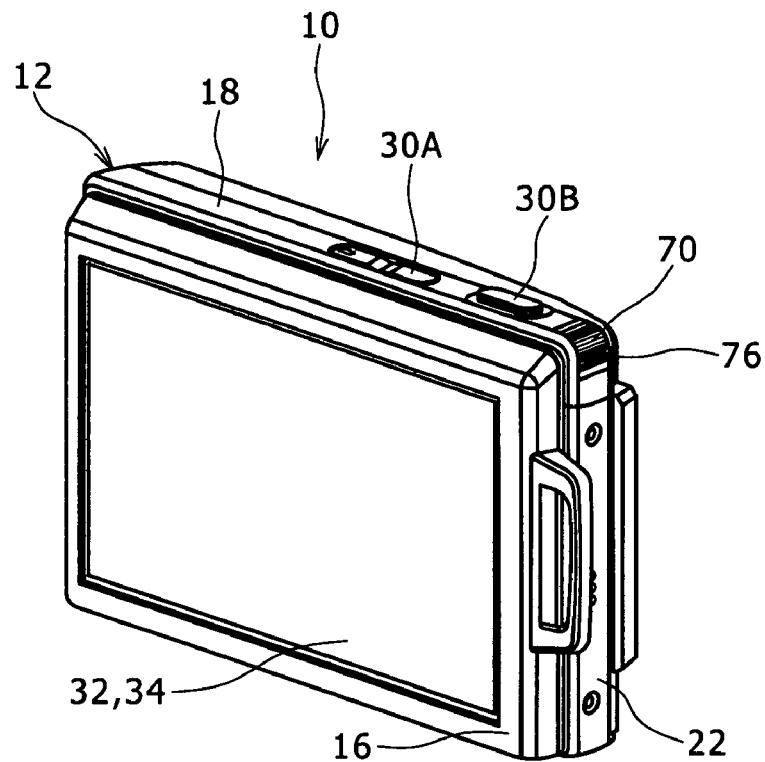
FIG. 3 is a perspective view of the imaging apparatus, as viewed from a rearward direction.
Figure 4:
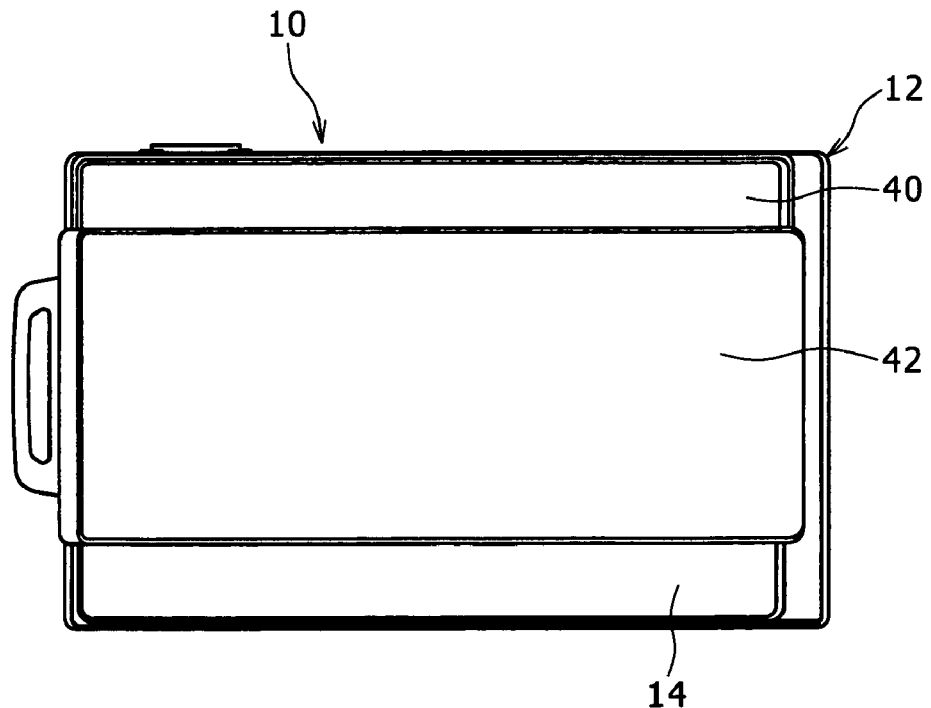
FIG. 4 is a front view of the imaging apparatus, in which the condition where the barrier of the imaging apparatus is located at the closing position is shown.
Figure 5:
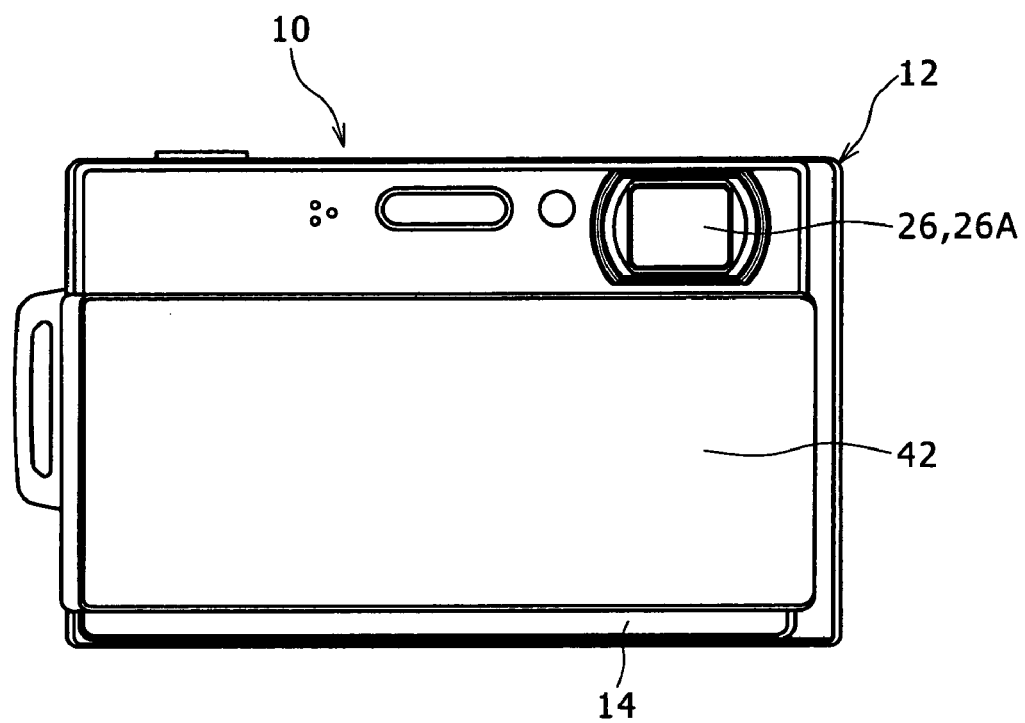
FIG. 5 is a front view of the imaging apparatus, in which the condition where the barrier of the imaging apparatus is located at the opening position is shown.
Figure 6:
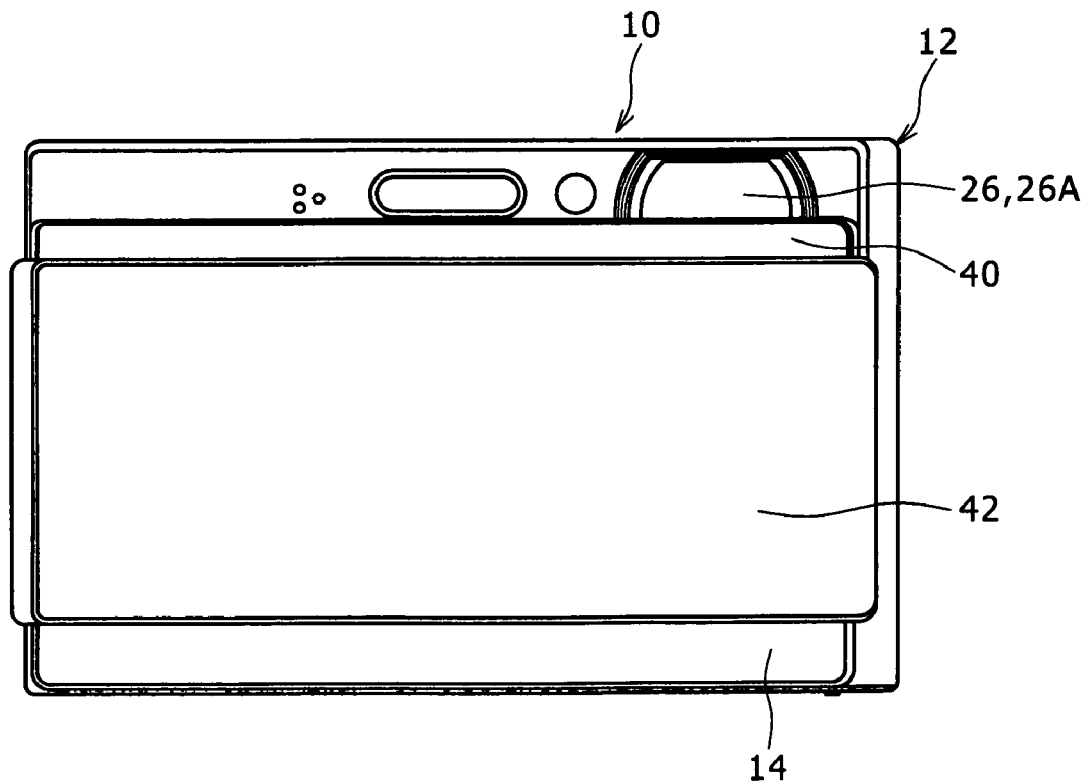
FIG. 6 is a front view of the imaging apparatus, in which a condition where the barrier of the imaging apparatus is located at a middle position between the closing position and the opening position is shown.
Figure 7:
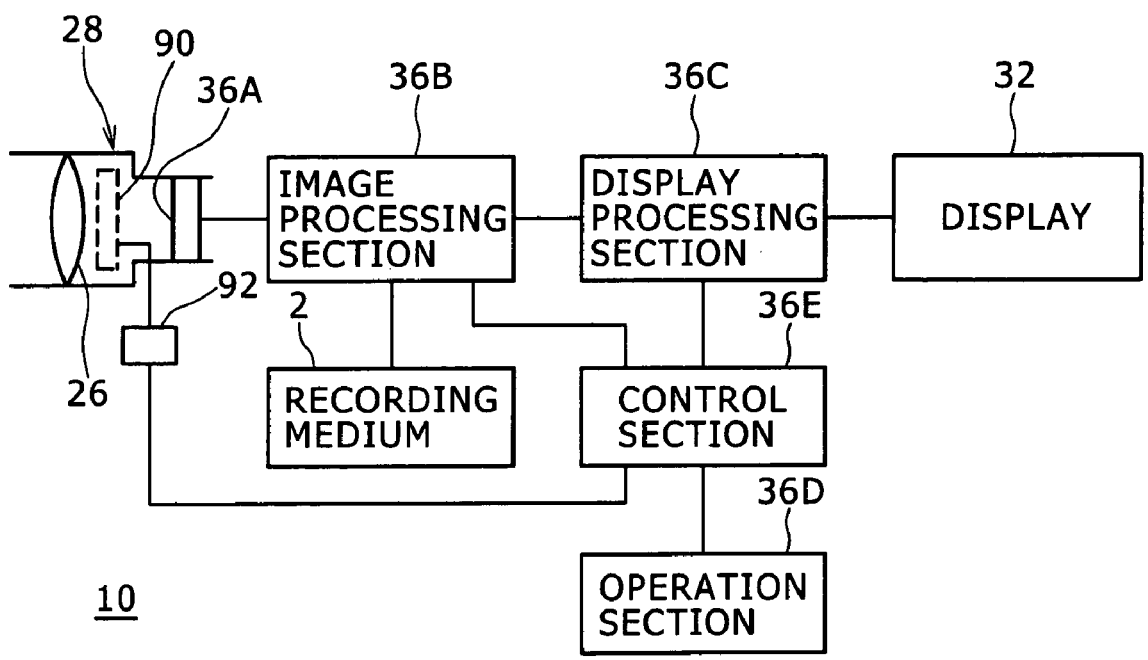
FIG. 7 is a block diagram illustrating a structure of the imaging apparatus.

FIG. 1 is a perspective view of an imaging apparatus 10 according to an embodiment of the present invention, in which a condition where a barrier 40 of the imaging apparatus 10 is located at a closing position P1 is shown, FIG. 2 is a perspective view of the imaging apparatus 10, in which a condition where the barrier 40 of the imaging apparatus 10 is located at an opening position P2 is shown, FIG. 3 is a perspective view of the imaging apparatus 10 as viewed from a rearward direction, FIG. 4 is a front view of the imaging apparatus 10, in which the condition where the barrier 40 of the imaging apparatus 10 is located at the closing position P1 is shown, FIG. 5 is a front view of the imaging apparatus 10, in which the condition where the barrier 40 of the imaging apparatus 10 is located at the opening position P2 is shown, FIG. 6 is a front view of the imaging apparatus 10, in which a condition where the barrier 40 of the imaging apparatus 10 is located at a middle position between the closing position P1 and the opening position Ps is shown, and FIG. 7 is a block diagram illustrating a structure of the imaging apparatus 10.

As shown in FIGS. 1 to 3, the imaging apparatus 10 according to the embodiment of the present invention is a digital still camera.

The imaging apparatus 10 includes a housing 12 forming an external armor. Incidentally, in this specification, a forward direction shall be the subject side, a rearward direction shall be the image formation side, and the left and right of the imaging apparatus 10 shall be based on the condition of the imaging apparatus 10 when viewed from the forward direction.

As shown in FIGS. 1 to 3, the housing 12 has a thickness in the forward/rearward direction, a height in a vertical direction that is larger than the thickness in size, and a width in the left/right direction that is larger than the height in size, and is formed into a thin flat rectangular plate-shape.

The housing 12 has a front surface 14 facing in the forward direction, a rear surface 16 facing in the rearward direction, a top surface 18 facing in an upward direction, a bottom surface 20 facing in a downward direction, and a left side surface 22 and a right side surface 24 that face in the left direction and in the right direction, respectively.

The barrier 40 and a barrier opening/closing member 42 are provided on the front surface 14.

As shown in FIG. 2, a lens barrel 28 housing an imaging optical system 26 is provided in a right side portion of the housing 12 so as to extend vertically. An imaging lens 26A (objective lens) is located at the foremost portion of the imaging optical system 26.

In this embodiment, as shown in FIG. 7, the imaging optical system 26 is configured to have a zoom mechanism (zoom optical system) 90 whose zoom ratio is variable. The zoom mechanism 90 is configured to include an actuator 92, such as a rotary motor, a linear motor, etc., which causes the zoom mechanism 90 to be zoom-operated. This actuator 92 is operated by a zoom lever 70.

The front surface 14 of the housing 12 is formed with an opening in a region of an upper portion thereof that is adjacent the right side portion of the front surface 14. The imaging lens 26A which is arranged at the foremost portion of the imaging optical system 26 is provided so as to face in the forward direction through the opening. Thus, the imaging lens 26A is provided at the upper portion of the front surface 14.

Incidentally, in addition to the imaging lens 26A, the imaging optical system 26 is configured to have a prism located rearward of the imaging lens 26A and causing an optical path to be bent downward 90 degrees, a plurality of lenses arranged downwardly of the prism and along the optical path, a diaphragm mechanism arranged in the optical path, etc., none of which are illustrated.

A light emission section 28A irradiating an illuminating light for use in measuring of a focus length, etc., a flash section 28B emitting an auxiliary illuminating light (flashing light), etc. are provided at a portion of the front surface 14 on the left side of the imaging lens 26A.

At the top surface 18 of the housing 12, a power source switch 30A and a shutter button (release button) 30B are provided.

The zoom lever 70 is provided so as to be arranged at a corner portion 76 where the top surface 18 and the side surface 22 intersect each other. The shutter button 30B and the zoom lever 70 are located in close proximity. The zoom lever 70 constitutes an operating lever.

As shown in FIG. 3, on a substantially entire surface of the rear surface 16, a display 32 which displays a picked-up image (image data), an operation screen for performing various setting operations concerning shooting and reproduction, etc., a menu screen, etc. is provided. The display 32 constitutes a display section.

In this embodiment, the display 32 is provided with a touch panel 34 which performs an operation input with the touch of a fingertip on a surface (display surface) of the touch panel. By operating the touch panel 34, various operations including switching of a shooting mode and a reproduction mode, etc., an operation for adjusting the zoom ratio of the imaging optical system 26 to the telescope side (tele-side) or the wide angle side (wide-side), etc. are adapted to be capable of being performed.

As shown in FIG. 7, the imaging apparatus 10 is provided with an imaging device 36A, an image processing section 36B, a display processing section 36C, an operation section 36D, a control section 36E, etc.

The imaging device 36A serves to pick up the image of the subject which is formed by the imaging optical system 26. As the imaging device, there may be employed various imaging devices such as CCD and CMOS sensors which are known in the past.

The image processing section 36B serves to generate image data on the basis of an image signal outputted from the imaging device 36A, and then record the image data on a recording medium 2 such as a memory card.

The display processing section 36C serves to cause the image data to be displayed on the display 32 and cause the operation screen or the menu screen, etc. to be displayed on the display 32.

The operation section 36D is configured to include the power source switch 30A, the shutter button 30B, the touch panel 34, etc.

The control section 36E serves to control the image processing section 36B and the display processing section 36C according to the operation by the operation section 36D and is configured to include a CPU and the like.

Next, the barrier 40 to which the gist of the present invention is applied will be discussed in detail.

Figure 8:
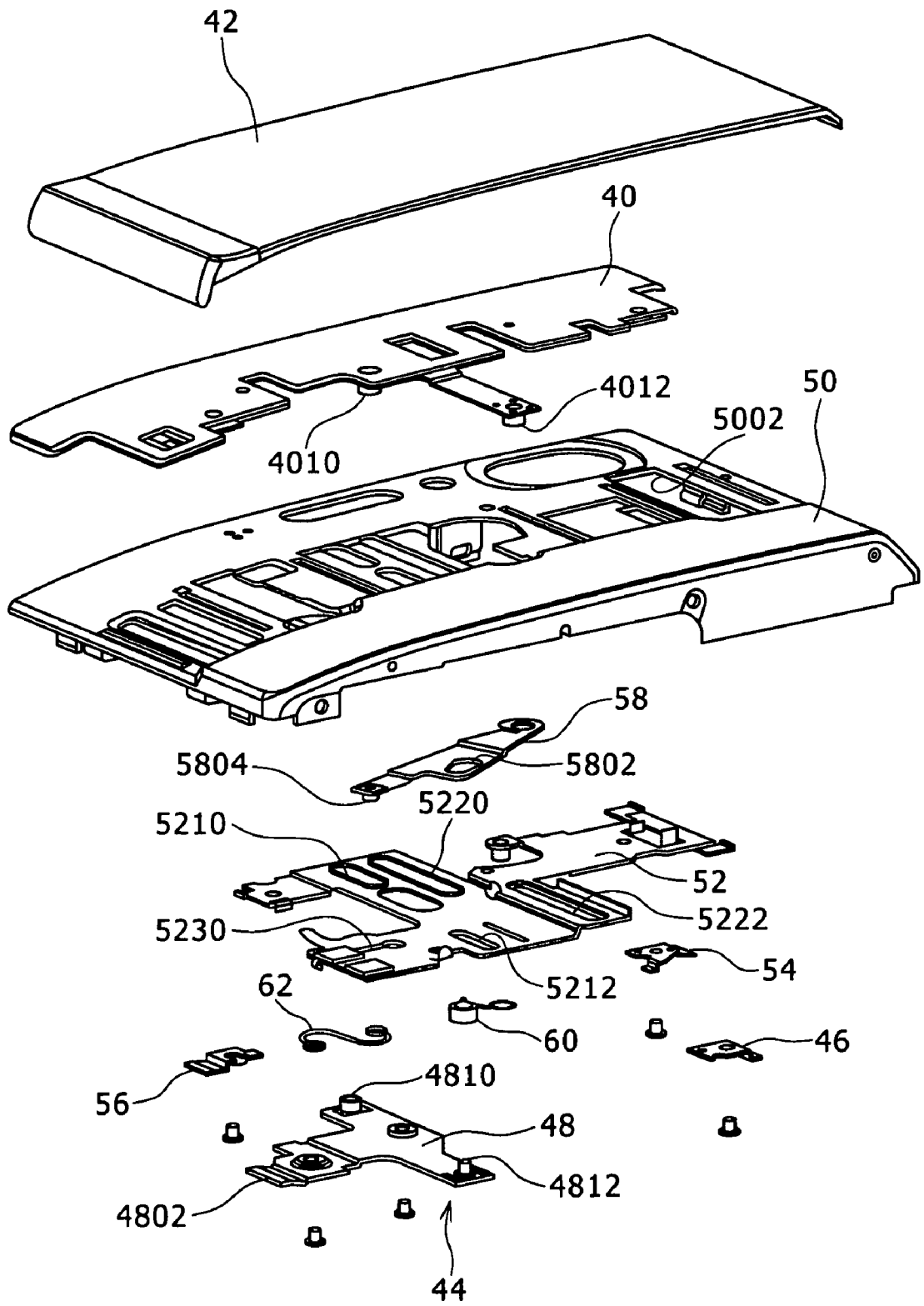
FIGS. 8 and 9 are each an exploded perspective view illustrating structures of the barrier, a barrier opening/closing member and an interlock mechanism.
Figure 9:
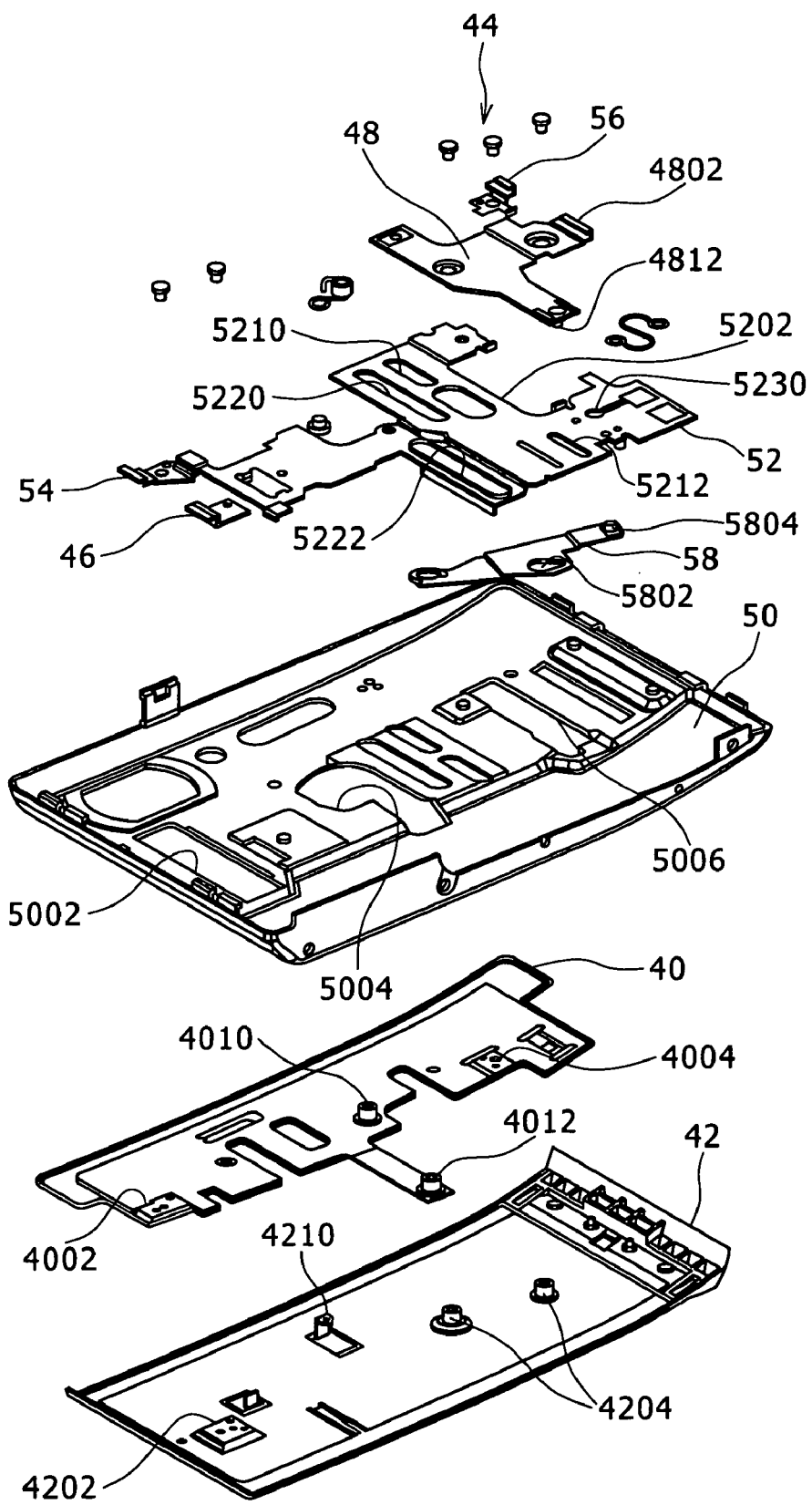

FIGS. 8 and 9 are each an exploded perspective view illustrating structures of the barrier 40, the barrier opening/closing member 42 and an interlock mechanism 44.

Figure 10:
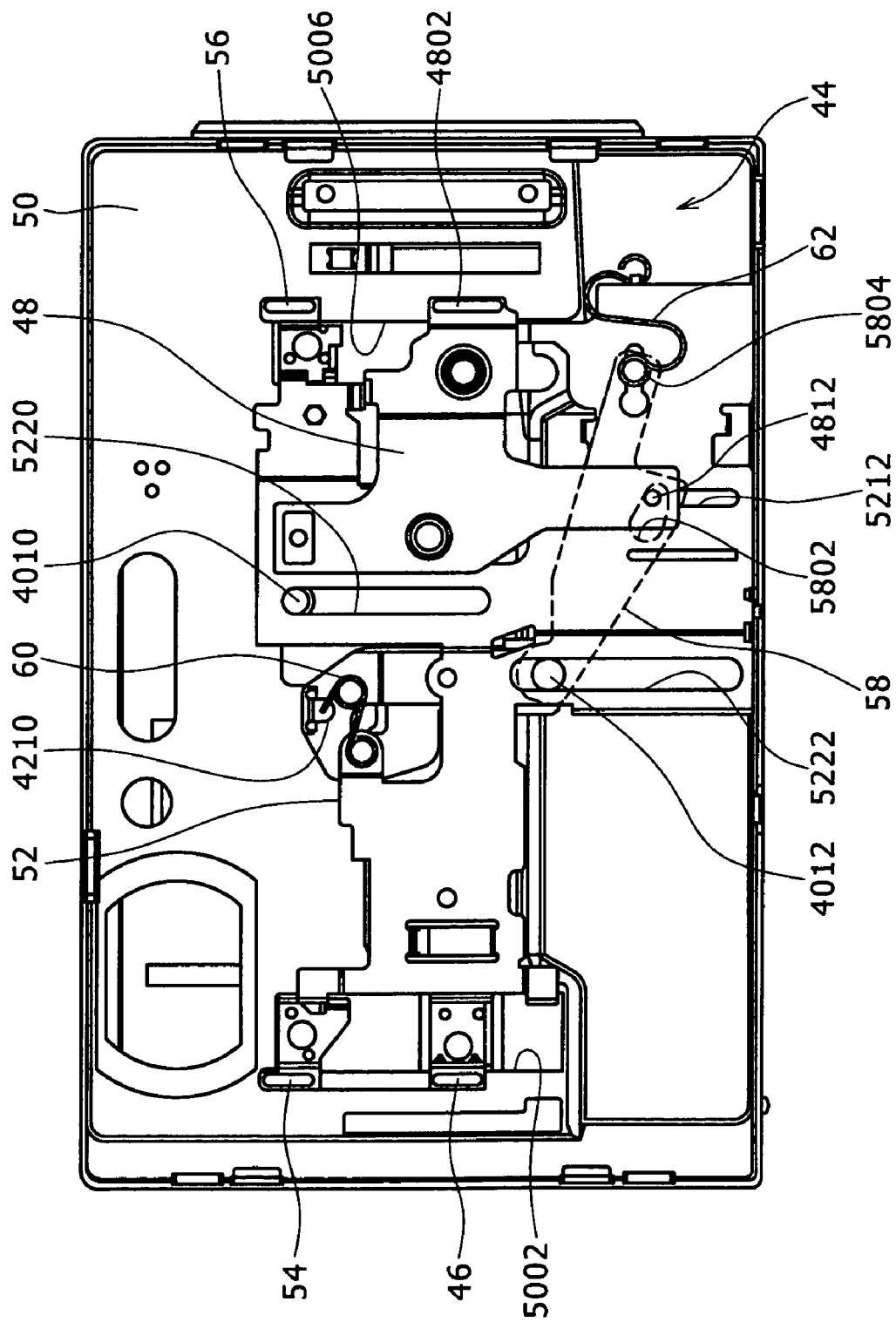
FIG. 10 is a rear view of the interlock mechanism in a case where the condition where the barrier is located at the closing position is viewed from the rearward direction.
Figure 11:
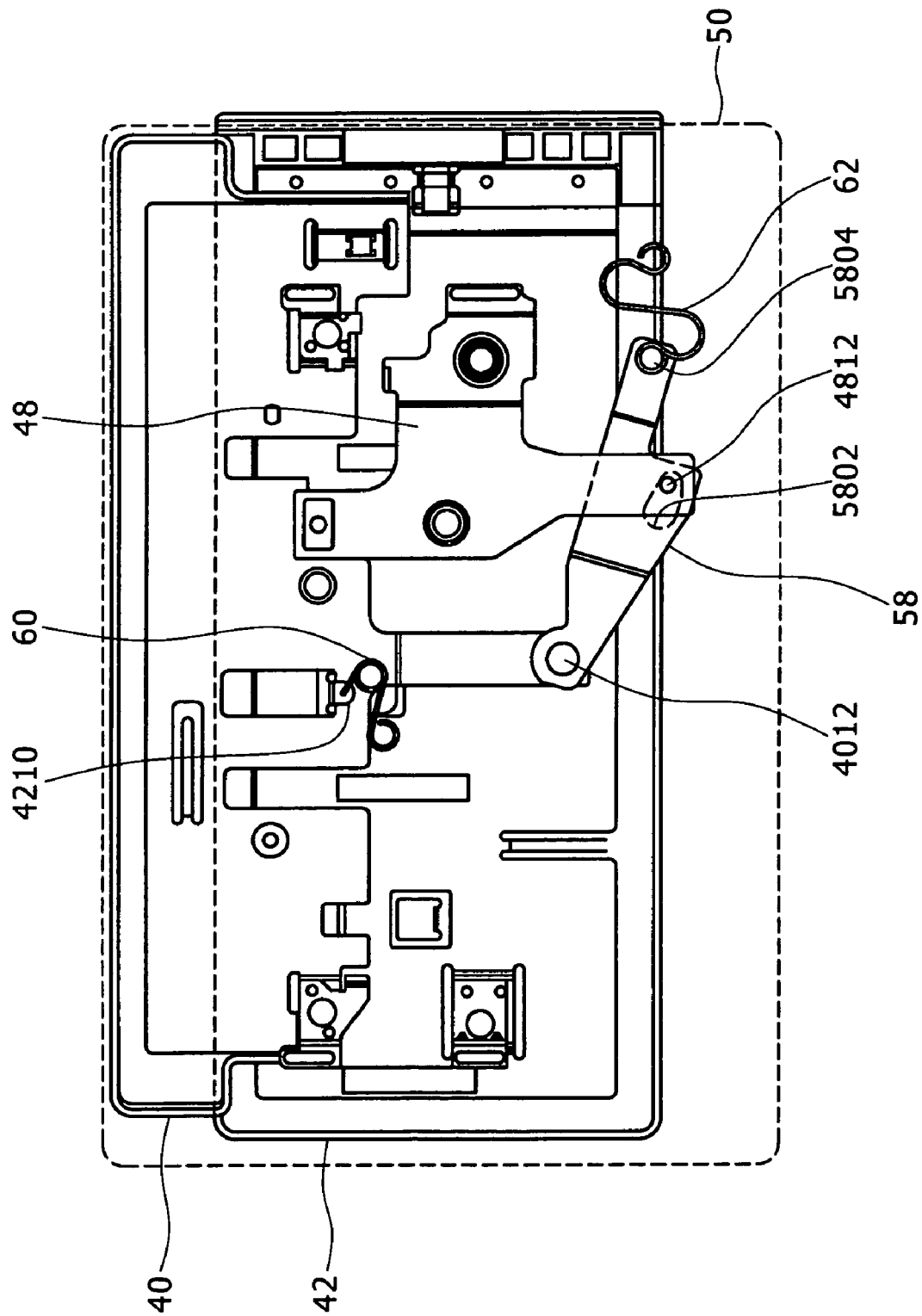
FIG. 11 is a rear view illustrating a positional relationship among the barrier, the barrier opening/closing member, and the interlock mechanism, in the case where the condition where the barrier is located at the closing position is viewed from the rearward direction.

FIG. 10 is a rear view of the interlock mechanism 44 in a case where the condition where the barrier 40 is located at the closing position is viewed from the rearward direction, and FIG. 11 is a rear view illustrating a positional relationship among the barrier 40, the barrier opening/closing member 42, and the interlock mechanism 44, in the case where the condition where the barrier 40 is located at the closing position is viewed from the rearward direction.

Figure 12:
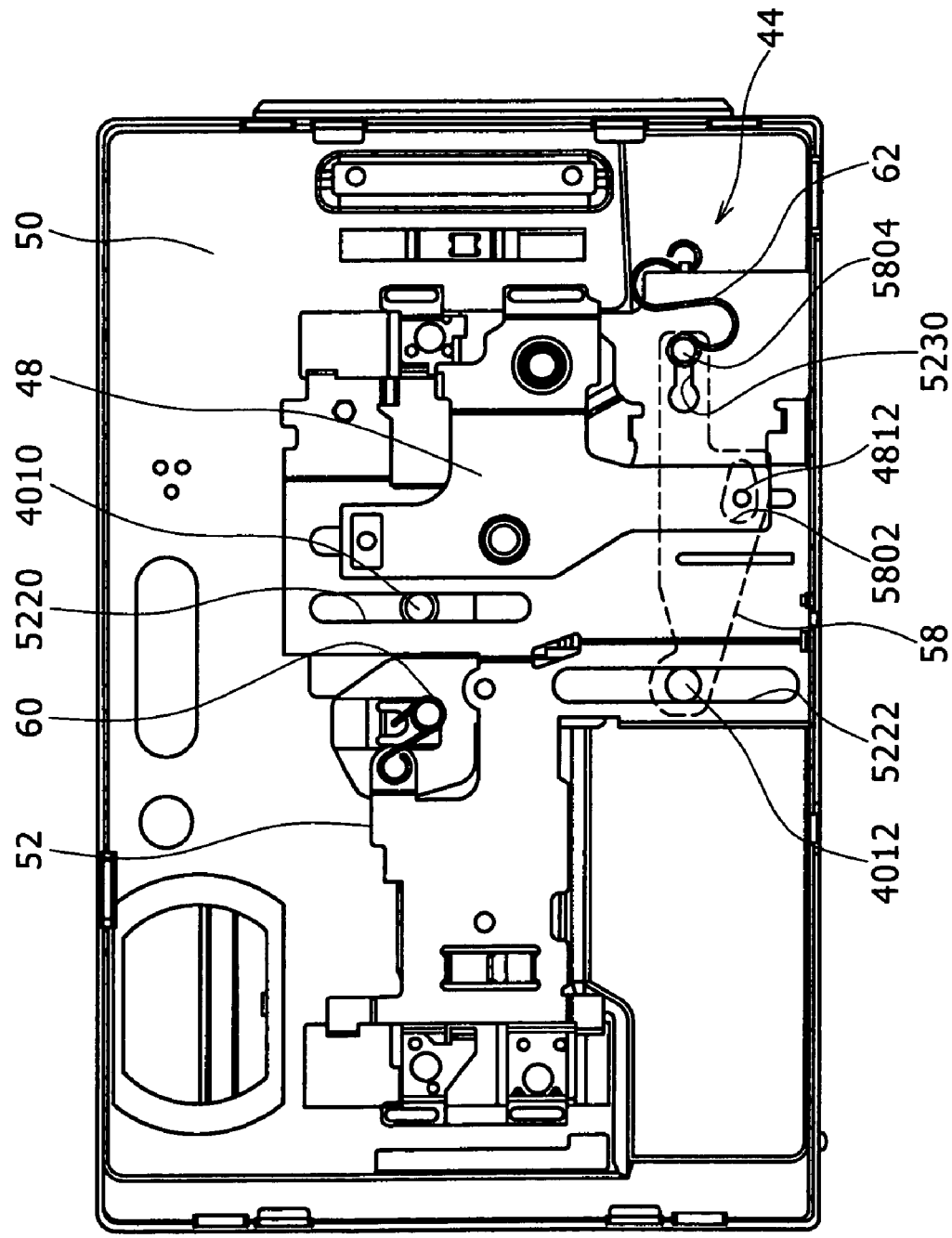
FIG. 12 is a rear view of the interlock mechanism in a case where the condition where the barrier is located at the middle position between the closing position and the opening position is viewed from the rearward direction.
Figure 13:
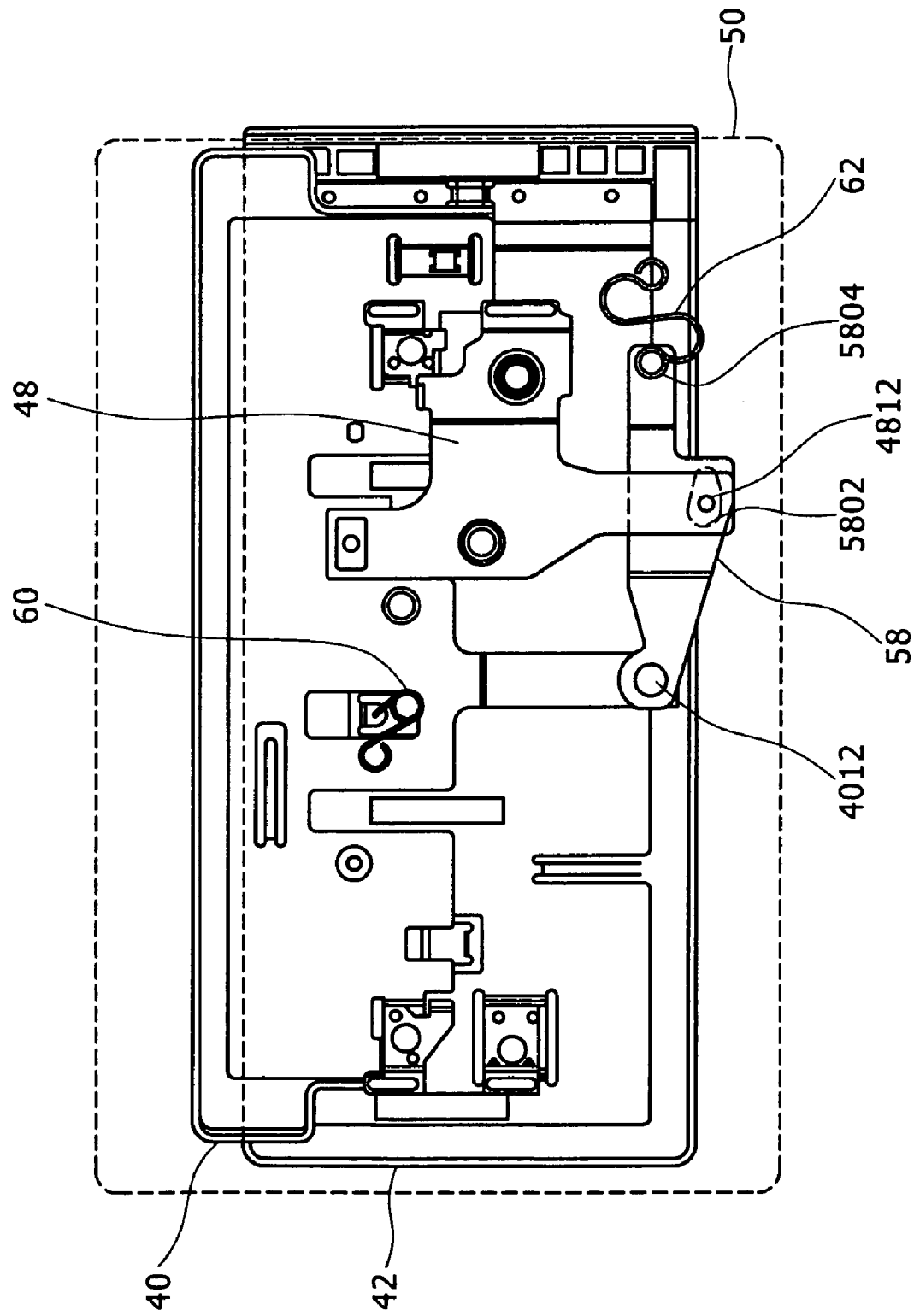
FIG. 13 is a rear view illustrating a positional relationship among the barrier, the barrier opening/closing member, and the interlock mechanism in the case where the condition where the barrier is located at the middle position between the closing position and the opening position is viewed from the rearward direction.

FIG. 12 is a rear view of the interlock mechanism 44 in a case where the condition where the barrier 40 is located at the middle position between the closing position and the opening position is viewed from the rearward direction, and FIG. 13 is a rear view illustrating a positional relationship among the barrier 40, the barrier opening/closing member 42, and the interlock mechanism 44, in the case where the condition where the barrier 40 is located at the middle position between the closing position and the opening position is viewed from the rearward direction.

Figure 14:
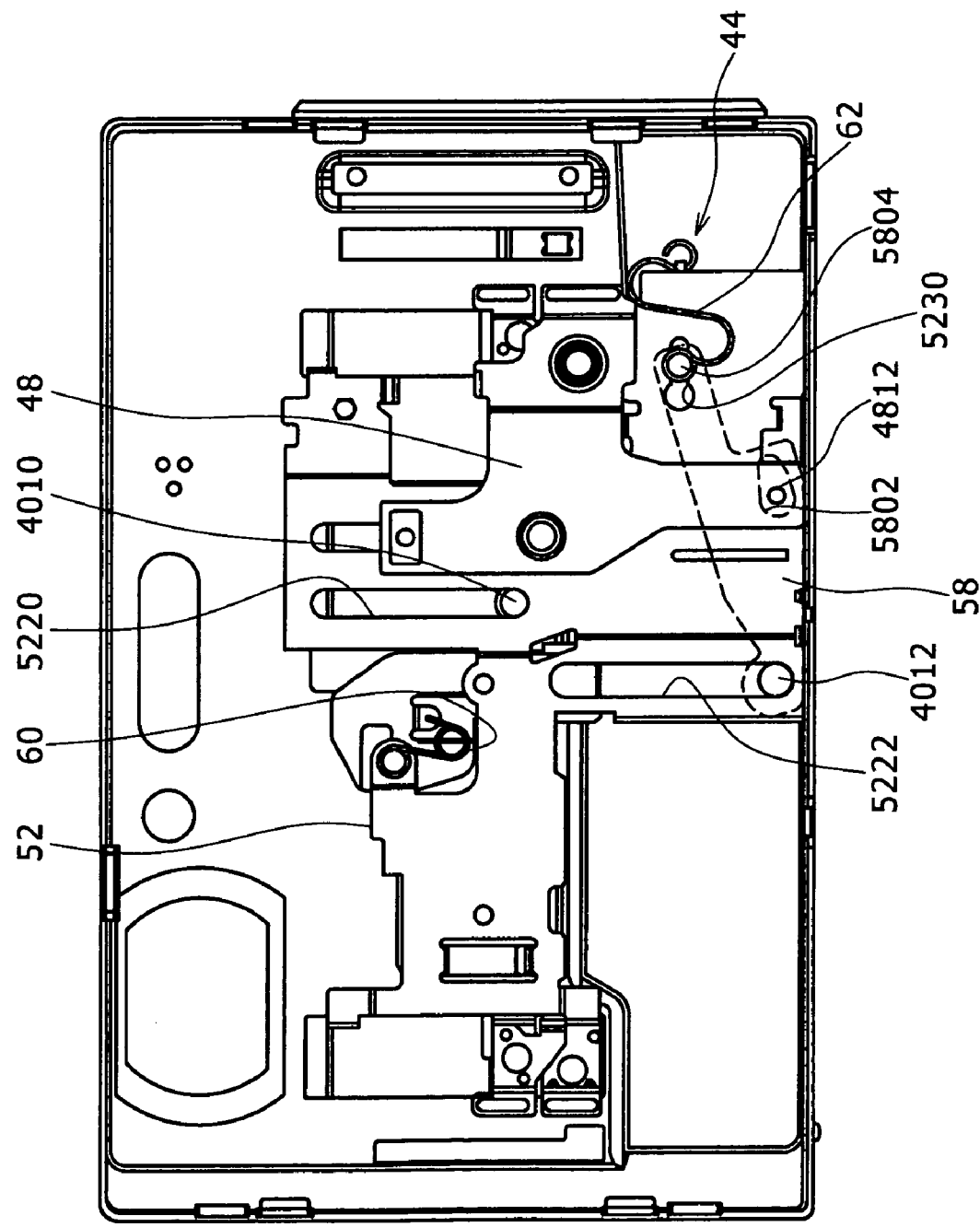
FIG. 14 is a rear view of the interlock mechanism in a case where the condition where the barrier is located at the opening position is viewed from the rearward direction.
Figure 15:
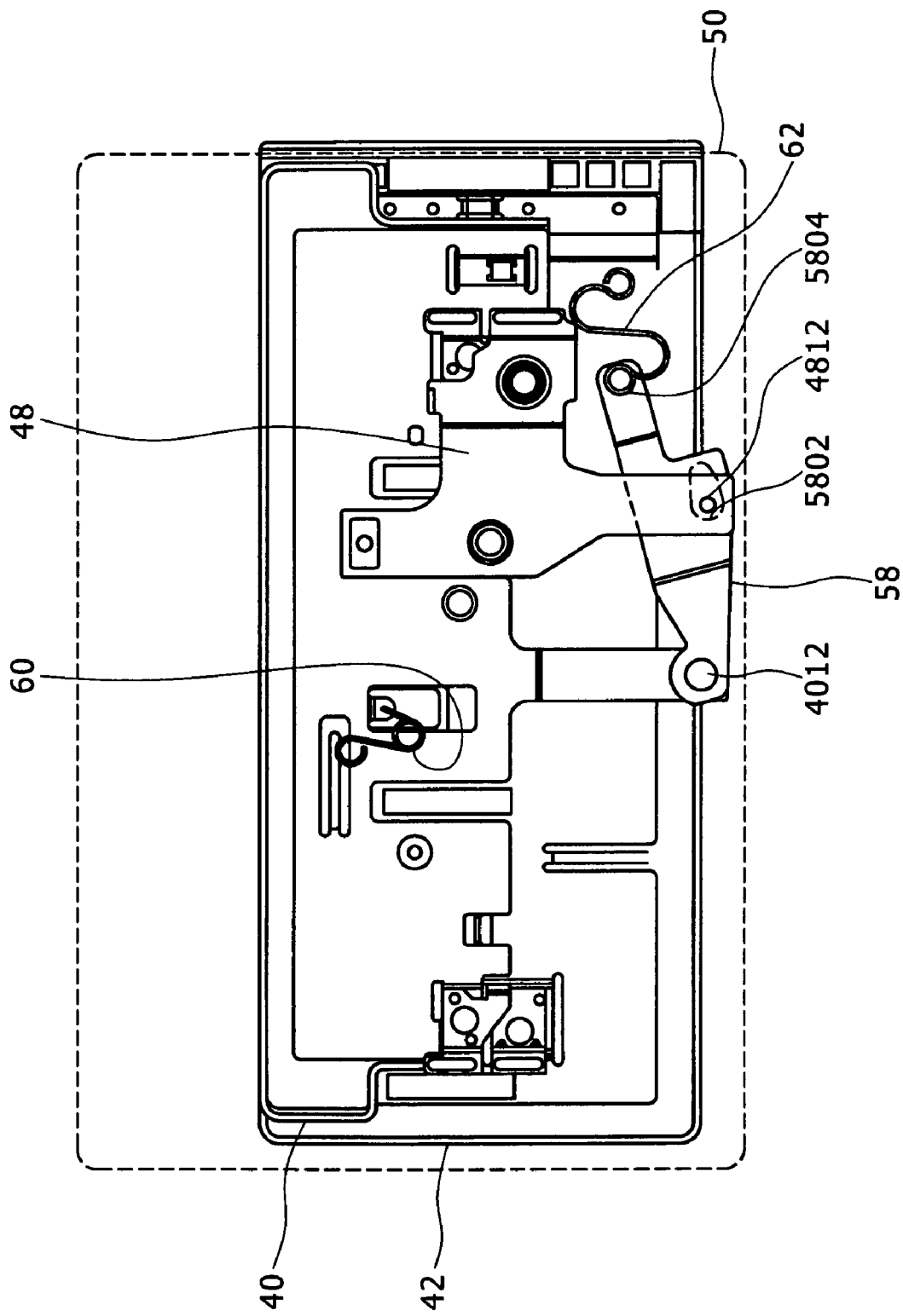
FIG. 15 is a rear view illustrating a positional relationship among the barrier, the barrier opening/closing member, and the interlock mechanism, in the case where the condition where the barrier is located at the opening position is viewed from the rearward direction.

FIG. 14 is a rear view of the interlock mechanism 44 in a case where the condition where the barrier 40 is located at the opening position is viewed from the rearward direction, and FIG. 15 is a rear view illustrating a positional relationship among the barrier 40, the barrier opening/closing member 42, and the interlock mechanism 44, in the case where the condition where the barrier 40 is located at the opening position is viewed from the rearward direction.

Figure 16:
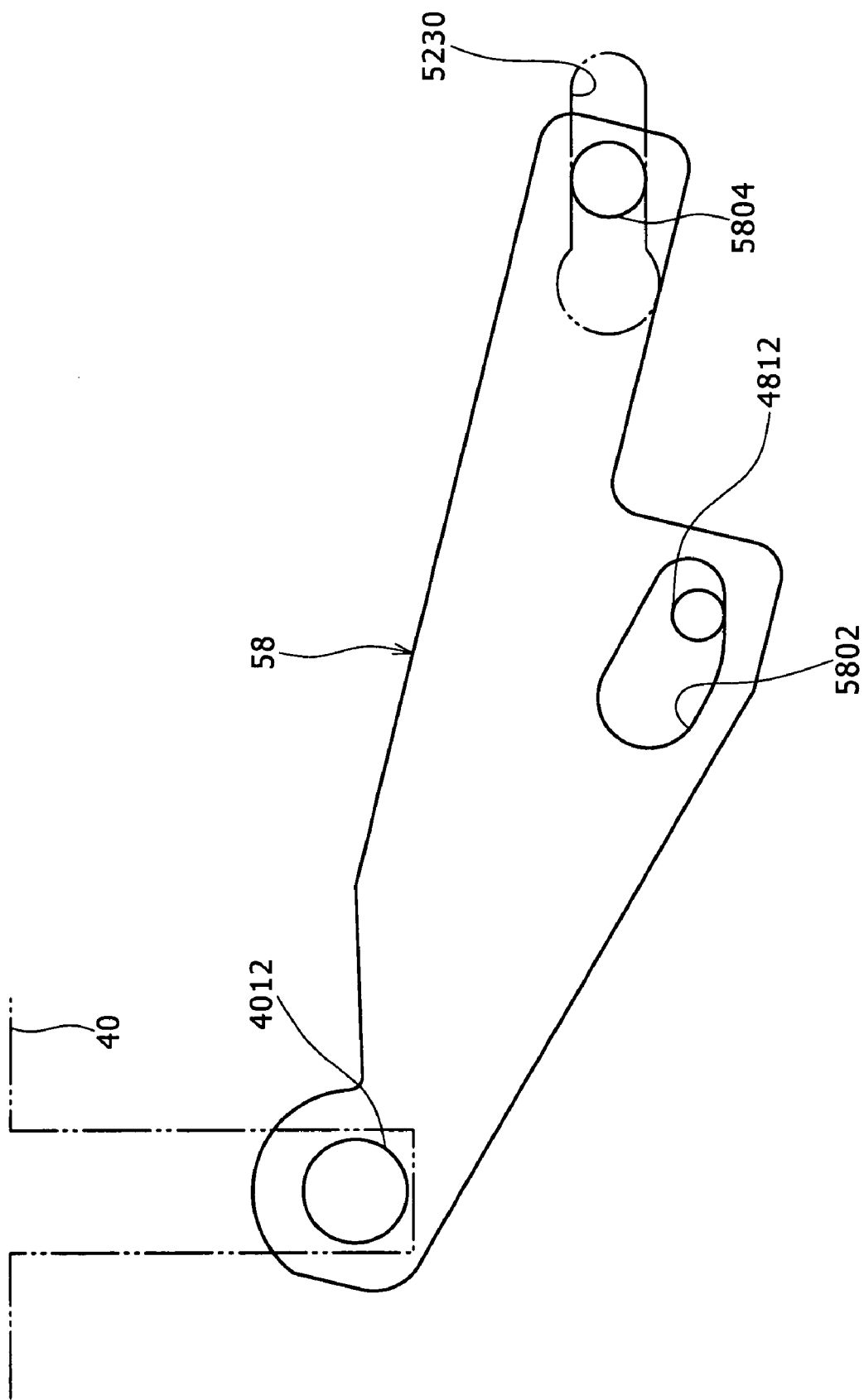
FIG. 16 is a plane view of an arm.

FIG. 16 is a plane view of an arm 58.

At the imaging apparatus 10, the barrier 40 opening and closing the imaging lens 26A, and the barrier opening/closing member 42 and the interlock mechanism 44 which cause the barrier 40 to be moved are provided.

The barrier opening/closing member 42 is provided at the housing 12 so as to be movable between a first position (FIG. 1) and a second position (FIG. 2).

The barrier opening/closing member 42 exhibits a flat-plate shape and is provided on the front surface 14 of the housing 12.

The barrier opening/closing member 42 has a width over a total length in the left/right direction of the front surface 14 of the housing 12, and a height less than a vertical height of the front surface 14, and exhibits a long and thin shape extending in the left/right direction.

The barrier opening/closing member 42 is installed as follows.

Referring to FIG. 9, a first guide piece 46 is to be attachingly mounted via a first boss portion 4202 onto a rear surface of the barrier opening/closing member 42 and a second guide piece 48 is to be attachingly mounted via two second boss portions 4204 onto the rear surface of the barrier opening/closing member 42.

On the other hand, a sheet metal-made, plate-shaped frame 52 is to be attachingly mounted onto a rear surface of a front surface plate 50 constituting the front surface 14 of the housing 12.

The first guide piece 46 is arranged in an opening 5002 of the front surface plate 50 and provided so as to be vertically slidable along an edge of the opening 5002 on the side of the rear surface of the front surface plate 50 as shown in FIG. 10.

Again referring to FIG. 9, the two boss portions 4204 are to be inserted through openings 5004, 5006 of the front surface plate 50 and an opening 5202 of the frame 52, and the second guide piece 48 is to be attachingly mounted to the two boss portions 4204, whereby the second guide piece 48 is arranged on a rear surface of the frame 52.

A guide portion 4802 of the second guide piece 48 is to be penetrated through the opening 5202 of the frame 52 and located on the rear surface of the front surface plate 50 so as to be vertically slidable as shown in FIG. 10.

By the first and second guide pieces 46, 48, the barrier opening/closing member 42 is adapted to be not removed forward from the front surface 14 of the housing 12.

As shown in FIG. 8, the second guide piece 48 has guide axes 4810, 4812 protrusively provided at portions thereof spaced apart from each other. The guide axes 4810, 4812 are to be inserted through two elongated holes 5210, 5212 of the frame 52 so as to be movable. The two elongated holes 5210, 5212 vertically extend in portions of the frame 52 which are different from each other in the left/right direction and in the vertical direction and the barrier opening/closing member 42 is realized so as to be smoothly moved vertically without turning.

Engagement of the guide axes 4810, 4812 with upper ends of the elongated holes 5210, 5212 determines the first position of the barrier opening/closing member 42 (FIG. 4) and engagement of the guide axes 4810, 4812 with lower ends of the elongated holes 5210, 5212 determines the second position of the barrier opening/closing member 42 (FIG. 5). Therefore, the barrier opening/closing member 42 is supported through the frame 52 to the housing 12 so as to be movable between the first position and the second position.

In this embodiment, the first position corresponds to a center in the height direction of the front surface 14 at which the barrier opening/closing member 42 is located.

The barrier 40 exhibits a flat-plate shape and is provided between the front surface 14 of the housing 12 and the barrier opening/closing member 42.

The barrier 40 is moved through the barrier opening/closing member 42 by the interlock mechanism 44 between the closing position (FIG. 4) at which it covers the imaging lens 26A, and an opening position (FIG. 5) at which it allows the imaging lens 26A to be exposed.

The barrier 40 has a width over the total length of the front surface 14 of the housing 12 in the left/right direction, and a height less than the vertical height of the front surface 14, and exhibits a long and thin shape extending in the left/right direction.

The barrier 40 is covered at the opening position with the barrier opening/closing member 42 which is located at the second position. The barrier 40 is, at the closing position, exposed in the upward direction of the barrier opening/closing member 42, which is located at the first position, and covers the imaging lens 26A.

Moreover, in a condition where the barrier opening/closing member 42 is located at the first position and the barrier 40 is located at the closing position, a front surface of the imaging apparatus 10 is constituted by the barrier 40, the barrier opening/closing member 42 and a portion of the front surface 14 of the housing 12 which is exposed in the downward direction of the barrier opening/closing member 42.

Moreover, in a condition where the barrier opening/closing member 42 is located at the second position and the barrier 40 is located at the opening position, the front surface of the imaging apparatus 10 is constituted by the barrier opening/closing member 42 and portions of the front surface 14 of the housing 12 which are exposed in the upward and downward directions of the barrier opening/closing member 42.

The barrier 40 is installed as follows.

Again referring to FIG. 9, a first guide piece 54 is to be attachingly mounted via a first boss portion 4002 to one end portion of a rear surface of the barrier 40 in a width direction, and a second guide piece 56 is to be attachingly mounted via a second boss portion 4004 to a region of the rear surface of the barrier 40 which is adjacent the other end portion of the rear surface of the barrier 40 in the width direction.

The first guide piece 54 is arranged in the opening 5002 of the front surface plate 50 and provided so as to be slidable vertically along an edge of the opening 5002 on the side of the rear surface of the front surface plate 50 as shown in FIG. 10.

The second guide piece 56 is arranged in the opening 5006 of the front surface plate 50 and provided so as to be slidable vertically along an edge of the opening 5006 on the side of the rear surface of the front surface plate 50 as shown in FIG. 10.

By the first and second guide pieces 54, 56, the barrier 40 is adapted to be not removed forward from the front surface 14 of the housing 12.

Moreover, as shown in FIG. 9, the barrier 40 has guide axes 4010, 4012 protrusively provided at regions of the rear surface thereof which are spaced apart from each other. The guide axes 4010, 4012 are to be penetrated through the opening 5004 of the front surface plate 50 and inserted through two elongated holes 5220, 5222 of the frame 52 so as to be movable. The two elongated holes 5220, 5222 vertically extend in portions of the frame 52 which are different from each other in the left/right direction and in the vertical direction and the barrier 40 is realized so as to be smoothly moved vertically without turning.

Engagement of the guide axes 4010, 4012 with upper ends of the elongated holes 5220, 5222 determines the closing position of the barrier 40 (FIG. 4) and engagement of the guide axes 4010, 4012 with lower ends of the elongated holes 5220, 5222 determines the opening position of the barrier 40 (FIG. 5).

Therefore, the barrier 40 is supported through the frame 52 to the housing 12 so as to be movable between the closing position and the opening position.

The interlock mechanism 44 serves to couple the barrier 40 and the barrier opening/closing member 42, cause, at the first position of the barrier opening/closing member 42, the barrier 40 to be located at the closing position, and cause, at the second position of the barrier opening/closing member 42, the barrier 40 to be located at the opening position.

As shown in FIG. 8, the interlock mechanism 44 is configured to include the arm 58, the frame 52, the second guide piece 48, toggle springs 60, 62, etc.

The arm 58 is provided so as to be arranged between the front surface plate 50 and the frame 52, and exhibits a long and thin shape.

The arm 58 has a guide axis 5804 protrusively provided at one end thereof in a longitudinal direction thereof. The guide axis 5804 is inserted through an elongated hole 5230 of the frame 52 so as to be movable. Therefore, the arm 58 is adapted to be swung around the guide axis 5804 and a portion of the elongated hole 5230 which serve as a fulcrum.

The elongated hole 5230 extends in the left/right direction. A vertical height of the elongated hole 5230 is configured to have a size which allows the guide axis 5804 to be moved without jolting vertically.

Moreover, the arm 58 is formed, in the middle portion of its longitudinal direction, with an engaging hole 5802 in which the guide axis 4812 of the second guide piece 48 is to be inserted via the elongated hole 5212 of the frame 52.

Moreover, as shown in FIG. 16, the guide axis 4012 of the barrier 40 is swingably coupled to the other end of the longitudinal direction of the arm 58.

Therefore, the barrier 40 and the barrier opening/closing 42 are coupled to each other through the arm 58.

Moreover, a connected portion between the arm 58 and the barrier 40 is located at a portion far separate from the fulcrum as compared to a connected portion between the arm 58 and the barrier opening/closing member 42. The movement of the barrier opening/closing member 42 causes the barrier 40 to be moved, through the arm 58, between the closing position and the opening position, with a distance larger than a distance between the first position and the second position.

When the barrier opening/closing member 42 is moved, the arm 58 is swung around the guide axis 5804 through the guide axis 4812 and the engaging hole 5802.

The swinging of the arm 58 causes the barrier 40 to be vertically moved through the guide axis 4012.

In this case, the barrier 40 and the barrier opening/closing member 42 are vertically linearly moved without changing their positions in the left/right direction, so that at the time of the swinging of the arm 58, the guide axis 4812 is moved within the engaging hole 5802, the guide axis 5804 is moved within the elongated hole 5230, and movement of the barrier 40 and the barrier opening/closing member 42 is realized so as to be smoothly performed.

Moreover, a shape of the engaging hole 5802 is set so as to allow the guide axis 4812 to be engaged with an edge of the engaging hole 5802 extending in the left/right direction and allow the swinging of the arm 58 to be smoothly performed, when the barrier opening/closing member 42 is moved. In other words, the shape of the engaging hole 5802 is set so as to allow the guide axis 4812 to be engaged with the edge of the engaging hole 5802 at right angles to the edge of the engaging hole 5802 and allow the swinging of the arm 58 to be smoothly performed.

As shown in FIGS. 10 and 14, one 60 of the toggle springs 60, 62 is provided between the frame 52 and a mounting piece 4210 protrusively provided on the rear surface of the barrier opening/closing member 42 and selectively urges the barrier opening/closing member 42 toward the first position or the second position. Thus, it has been realized that the condition where the barrier opening/closing member 42 is located at the first position and at the second position is stabilized and the jolting of the barrier opening/closing member 42 is prevented.

As shown in FIGS. 10 and 14, the other 62 of the toggle springs 60, 62 is provided between the guide axis 5804 of the arm 58 and the frame 52 and urges the guide axis 5804 in such a manner to cause the guide axis 5804 to be abutted against an edge of the elongated hole 5222 from a direction perpendicular to an extending direction of the elongated hole 5222. Thus, it has been realized that the condition where the barrier 40 is located at the closing position and the opening position is stabilized and the jolting of the barrier 40 is prevented.

Next, an opening/closing operation of the barrier 40 will be discussed.

(Closing Position)

As shown in FIGS. 1 and 4, the barrier opening/closing member 42 is located at the first position and the barrier 40 is located at the closing position.

In this condition, as shown in FIGS. 10 and 11, the arm 58 assumes a slant posture which allows the guide axes 4812,

5804 to be located downwardly of the guide axis 4012, and the barrier 40 and the barrier opening/closing member 42 are urged toward the first position and the closing position by the toggle spring 60 and the toggle spring 62, respectively.

(From the Closing Position to the Opening Position)

When the barrier opening/closing member 42 is moved to the second position from the first position as shown in FIG. 6, the arm 58 is swung and causes the barrier 40 to be moved downward with a stroke larger than the barrier opening/closing member 42, as shown in FIGS. 12 and 13.

(Opening Position)

When the barrier opening/closing member 42 is located at the second position as shown in FIGS. 2 and 5, the barrier 40 is located at the opening position, the imaging lens 26A is exposed and the barrier 40 is concealed by the barrier opening/closing member 42.

In this condition, as shown in FIGS. 14 and 15, the arm 58 assumes a slant posture which allows the guide axis 5804 to be located downwardly as compared to the guide axis 4012 and allows the guide axis 5802 to be become the same level as the guide axis 4012, and the barrier 40 and the barrier opening/closing member 42 are urged toward the second position and the opening position by the toggle spring 60 and the toggle spring 62, respectively.

(From the Opening Position to the Closing Position)

When the barrier opening/closing member 42 is moved to the first position from the second position as shown in FIG. 6, the arm 58 is swung and causes the barrier 40 to be moved upward with the stroke larger than the barrier opening/closing member 42 as shown in FIGS. 12 and 13. When the barrier opening/closing member 42 is located at the first position as shown in FIGS. 1 and 4, the barrier 40 is located at the closing position.

According to this embodiment, the barrier 40 and the barrier opening/closing member 42 are coupled to each other by the interlock mechanism 44 which causes the barrier 40 to be located at the closing position at which the barrier 40 covers the imaging lens 26A at the first position of the barrier opening/closing member 42, causes the barrier 40 to be located at the opening position at which the barrier 40 allows the imaging lens 26A to be exposed at the second position of the barrier opening/closing member 42, and causes the barrier 40 at the opening position to be covered by the barrier opening/closing member 42 located at the second position.

Therefore, two components including the barrier 40 and the barrier opening/closing member 42 can be laid out with respect to the housing 12, so that this becomes advantageous in obtaining a degree of freedom of a design characteristic of the imaging apparatus 10.

Namely, in the case where a piece of the barrier is employed as in the past, the barrier which is to be located at the closing position is forced to be located at a position displaced relative to the surface of the housing. However, in this embodiment, in the condition where the barrier 40 is located at the closing position and the barrier opening/closing member 42 is located at the first position as shown in FIG. 4, the barrier opening/closing member 42 can be located at the center in the height direction of the front surface 14 of the housing 12, so that a balance of the barrier 40 and the barrier opening/closing member 42 with respect to the front surface 14 of the housing 12 can be taken, which becomes advantageous in obtaining a degree of freedom of a design characteristic of the front surface of the imaging apparatus 10.

Moreover, if color, patterns, etc. are applied to the front surface 14 of the housing 12 and the barrier 40 in such a manner that the front surface 14 of the housing 12 and the barrier 40 have the same appearance and the color, patterns, etc. serve as decorations for the front surface 14 of the housing 12 and the barrier 40, and color, patterns, etc. are applied to the barrier opening/closing member 42 in such a manner that the barrier opening/closing member 42 has an appearance difference from those of the front surface 14 of the housing and the barrier 40 and the color, patterns, etc. applied to the barrier opening/closing member 42 serve as decorations different from those provided by the color, patterns, etc. applied to the front surface 14 of the housing 12 and the barrier 40, when the barrier opening/closing member 42 is located at the first position as shown in FIGS. 1 and 4, the barrier opening/closing member 42 can serve as a belt-shaped decorative component which is located at the center in the vertical direction of the front surface of the housing 12, which is advantageous in improving the design characteristic of the front surface of the imaging apparatus 10.

Moreover, in this embodiment, the interlock mechanism 44 is configured to include the arm 58, whereby when the barrier opening/closing member 42 is moved between the first position and the second position, the barrier 40 is adapted to be vertically moved with the stroke larger than the barrier opening/closing member 42, so that an operation amount of the barrier opening/closing member 42 may be slight, which becomes advantageous in realizing an improvement in operability of the barrier 40.

Incidentally, as the interlock mechanism 44 which causes the barrier 40 and the barrier opening/closing member 42 to be coupled to each other, causes the barrier 40 to be located at the closing position at the first position of the barrier opening/closing member 42, and causes the barrier 40 to be located at the opening position at the second position of the barrier opening/closing member 42, there may be employed various structures of the related art which are configured by utilizing gear mechanisms and cam mechanisms. However, when the interlock mechanism 44 is configured to include the arm 58 as in this embodiment, the simplification of the structure is realized, which becomes advantageous in realizing a reduction in the dimensions and thickness of the housing 12.

Moreover, while the case where the imaging apparatus is the digital still camera has been discussed above with reference to this embodiment, the present invention may be applied to various imaging apparatus including a video camera, a camera-mounted mobile phone, a camera-mounted PDA, a camera-mounted music player, etc.

Next, the zoom lever 70 will be discussed.

Figure 17:
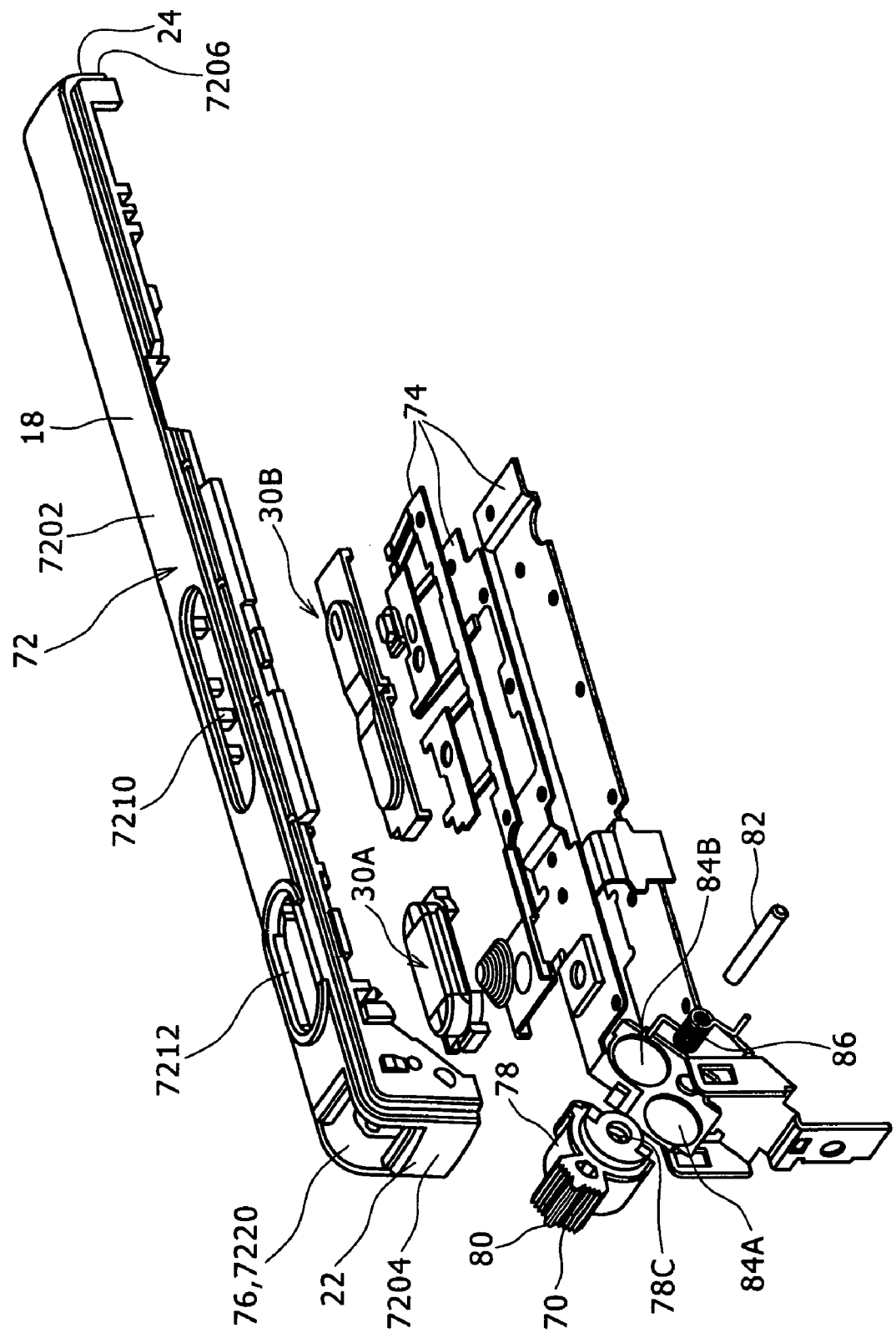
FIG. 17 is an exploded perspective view of an principal section including a zoom lever.
Figure 18:
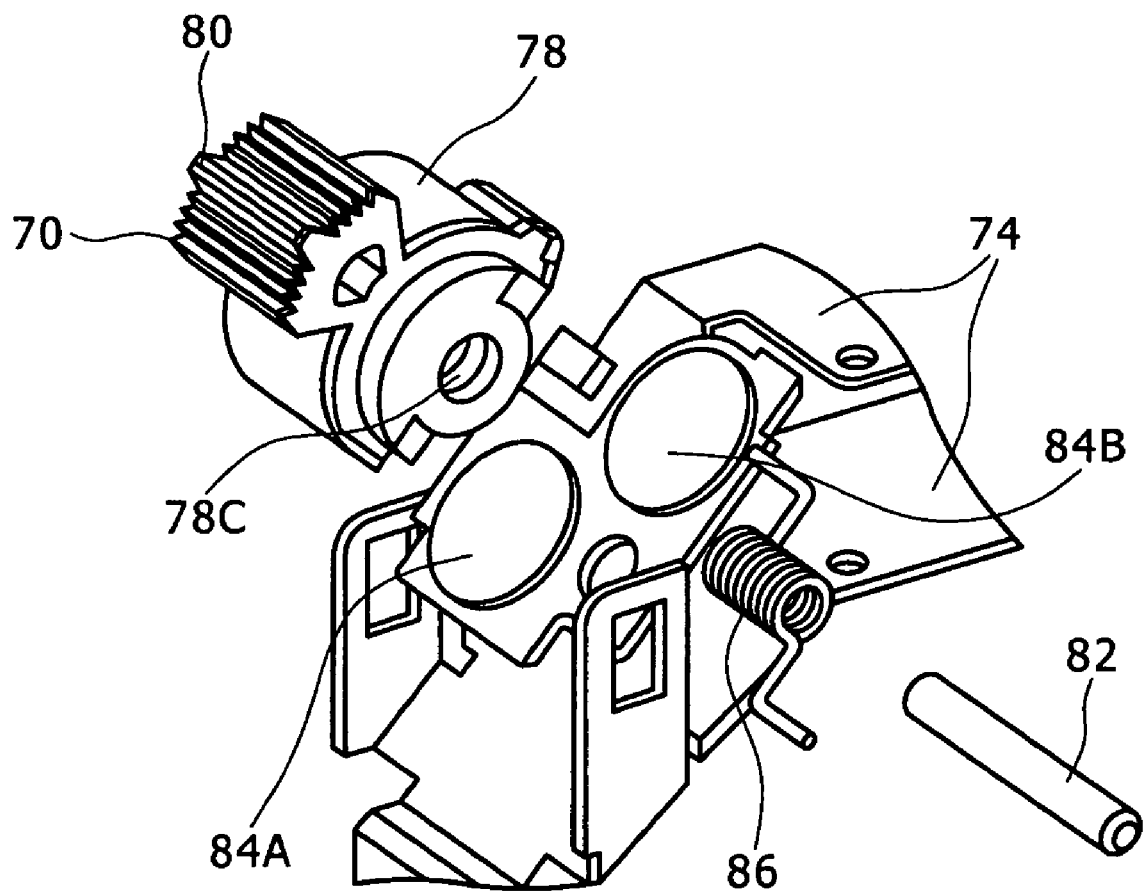
FIG. 18 is an enlarged fragmentary perspective view of the principal section shown in FIG. 17.
Figure 19:
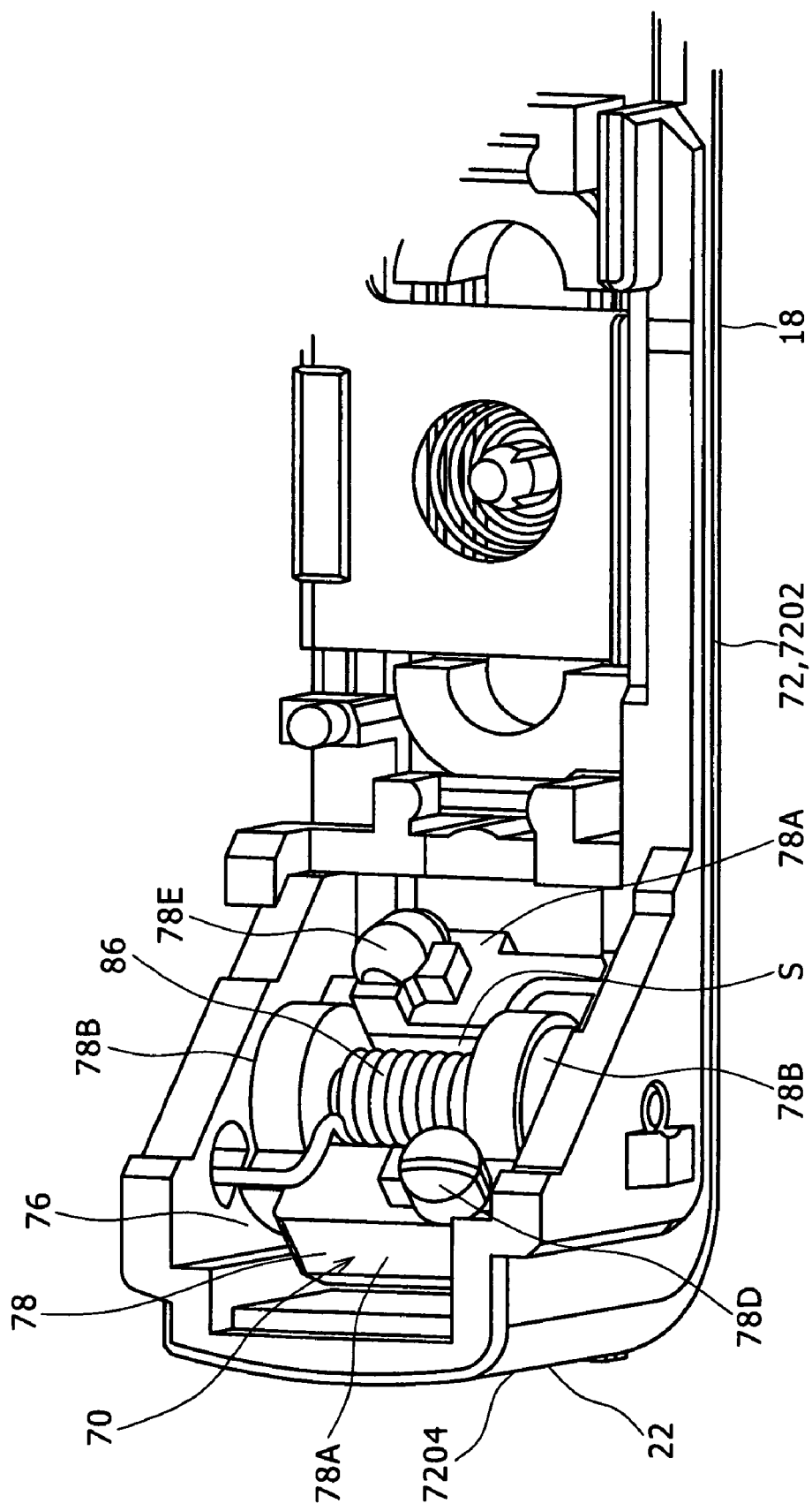
FIG. 19 is a perspective view illustrating a condition where the zoom lever is installed.
Figure 20:
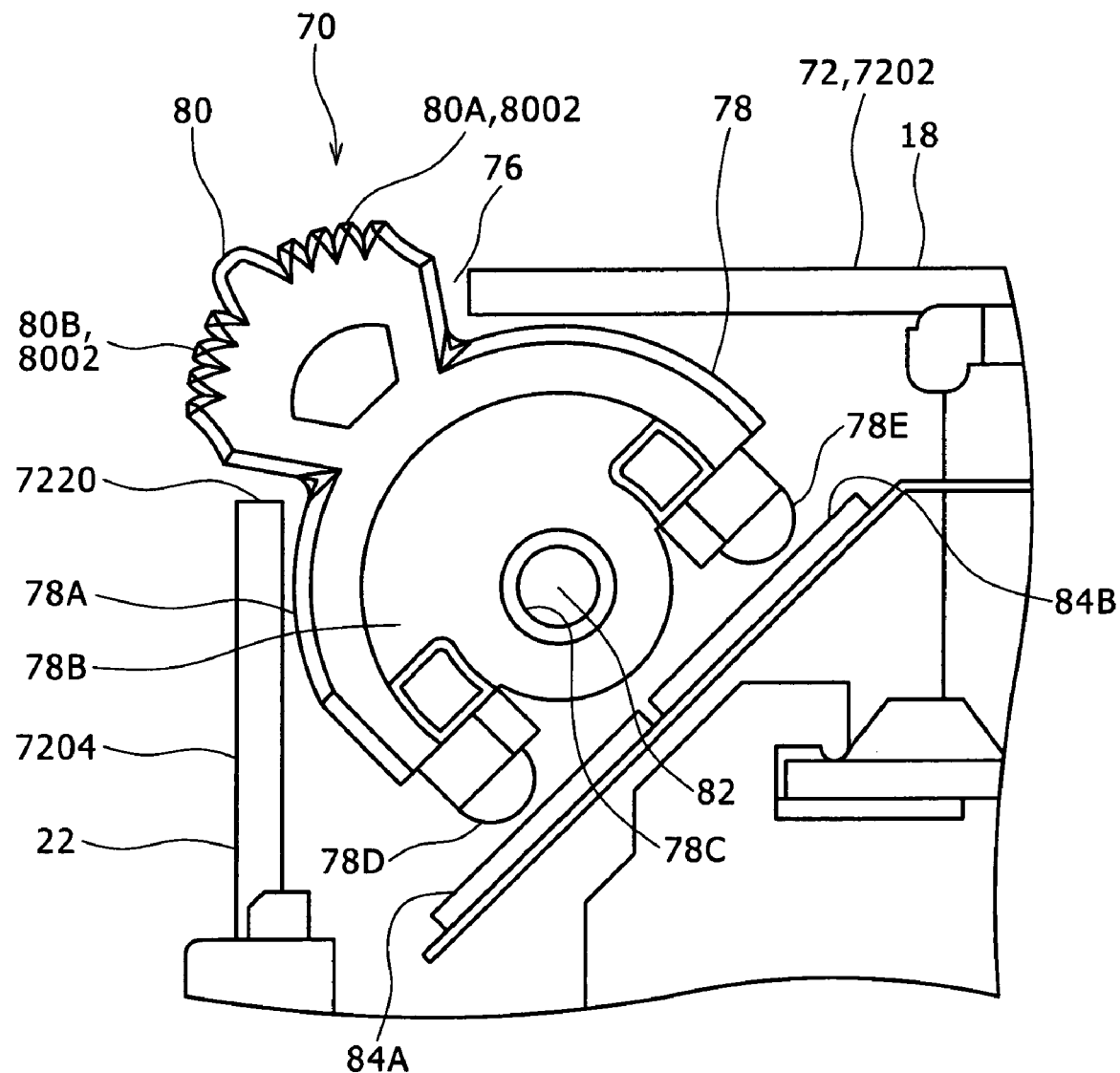
FIG. 20 is an explanatory view illustrating the zoom lever incorporated into a housing.
Figure 21:
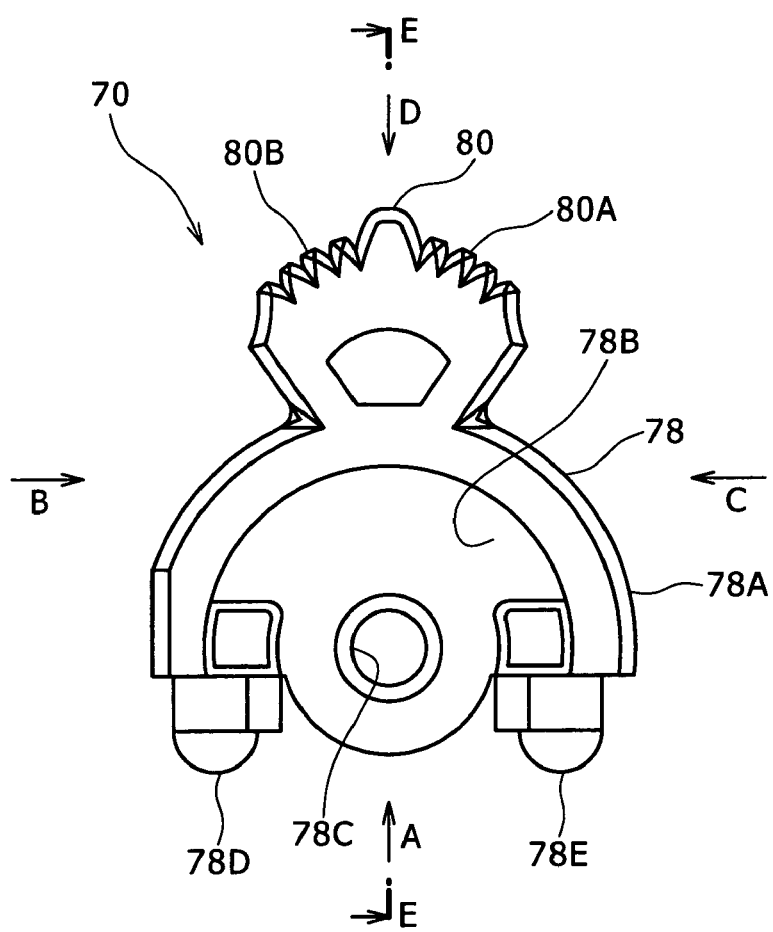
FIG. 21 is a front view of the zoom lever.
Figure 22:
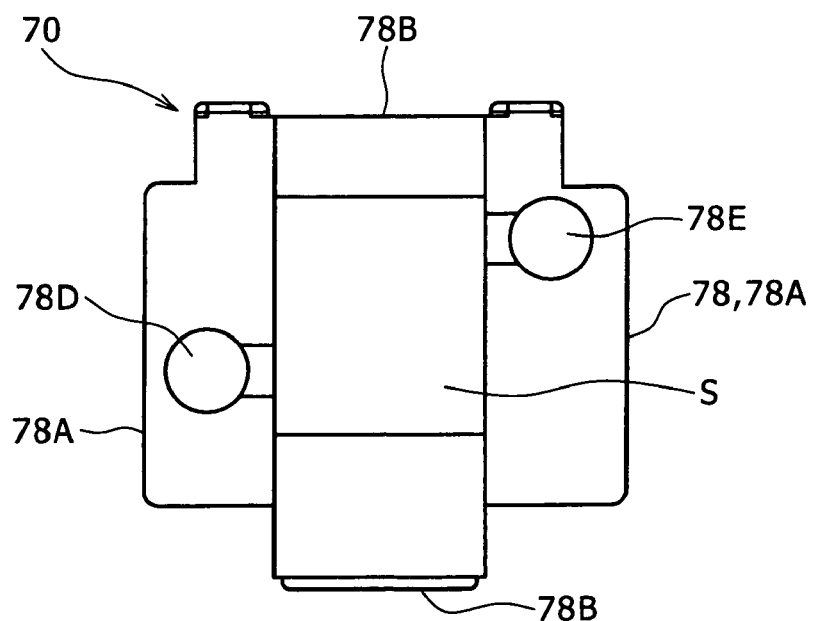
FIG. 22 is a view as viewed from an arrow A of FIG. 21.
Figure 23:
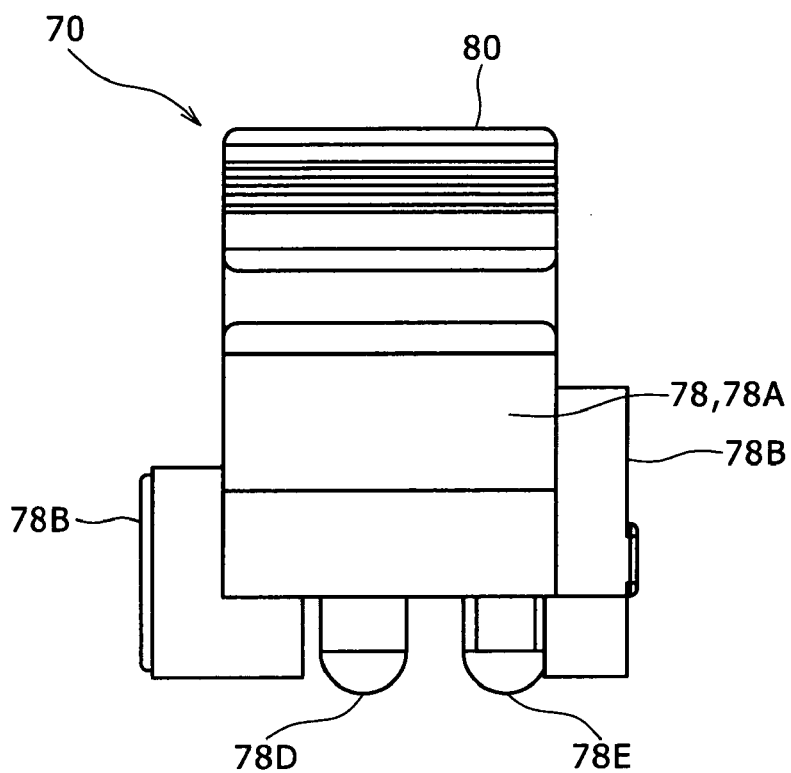
FIG. 23 is a view as viewed from an arrow B of FIG. 21.
Figure 24:
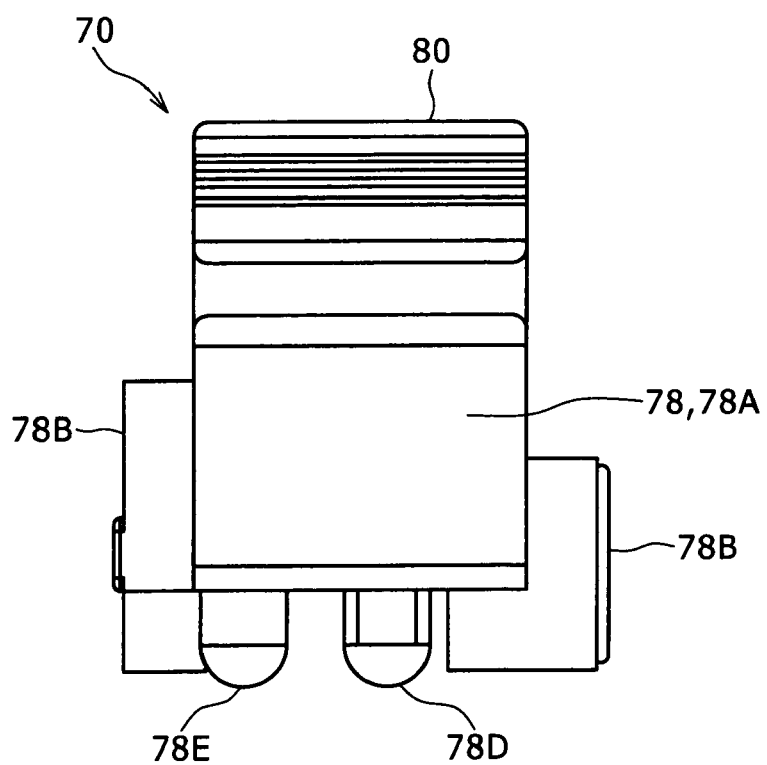
FIG. 24 is a view as viewed from an arrow C of FIG. 21.
Figure 25:
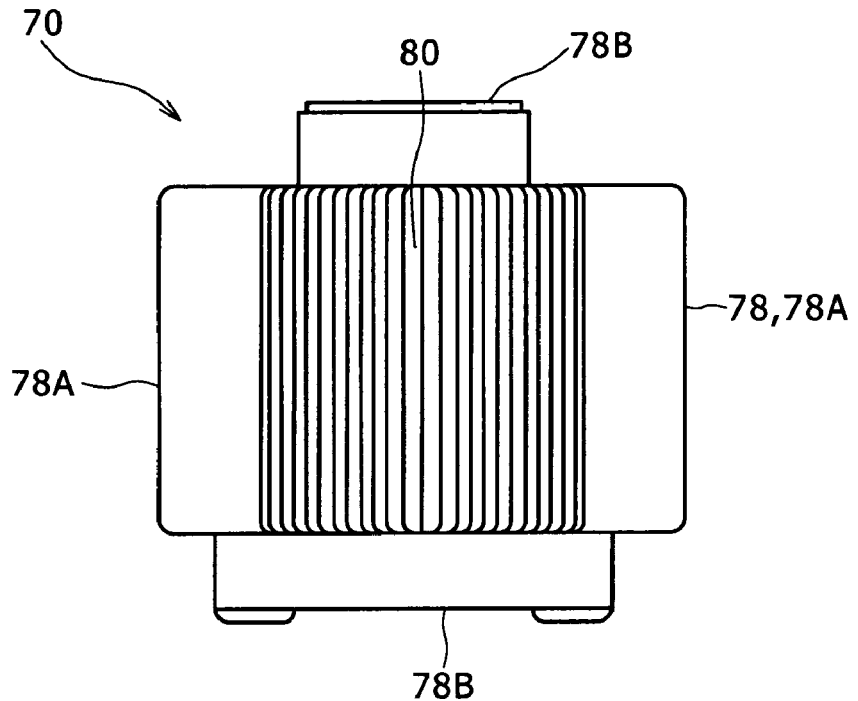
FIG. 25 is a view as viewed from an arrow D of FIG. 21.
Figure 26:
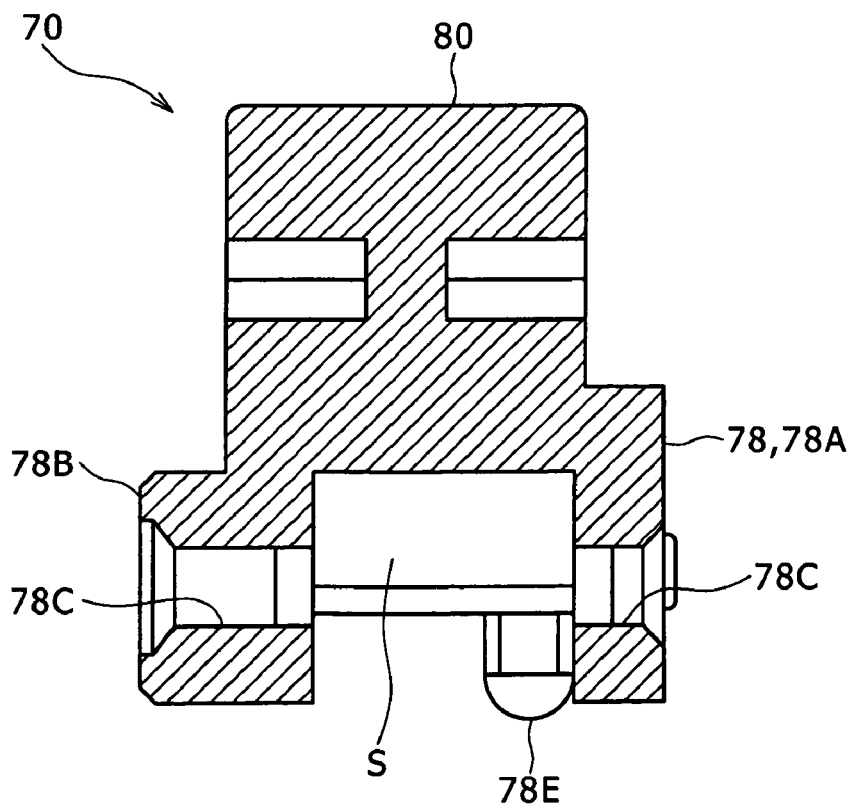
FIG. 26 is a sectional view taken along E-E line in FIG. 21.

FIG. 17 is an exploded perspective view of an principal section including the zoom lever 70, FIG. 18 is an enlarged fragmentary perspective view of the principal section shown in FIG. 17, FIG. 19 is a perspective view illustrating a condition where the zoom lever 70 is installed, FIG. 20 is an explanatory view illustrating the zoom lever 70 incorporated into the housing 12, FIG. 21 is a front view of the zoom lever 70, FIG. 22 is a view as viewed from an arrow A of FIG. 21, FIG. 23 is a view as viewed from an arrow B of FIG. 21, FIG. 24 is a view as viewed from an arrow C of FIG. 21, FIG. 25 is a view as viewed from an arrow D of FIG. 21, and FIG. 26 is a sectional view taken along E-E line in FIG. 21.

As shown in FIG. 17, the top surface 18 is constituted by a smoothly planed board 72 for the top surface, which includes a top surface plate portion 7202 and left and right side surface plate portions 7204, 7206 which are bent at both ends of the top surface plate portion 7202 and constitute the side surfaces 22, 24 of the housing 12. The smoothly planed board 72 is installed to chassis 74.

The top surface plate portion 7202 is provided with a power source switch-housing cutout portion 7210 housing the power source switch 30A, and a shutter button-housing cutout portion 7212 housing the shutter button 30B. A cutout portion 7220 in which the zoom lever 70 is to be inserted is provided at the corner portion 76 where the top surface plate portion 7202 and the left surface plate portion 7204 intersect each other.

The zoom lever 70 is provided so as to be swingable around an axis center which extends in the forward/rearward direction of the housing 12.

As shown in FIGS. 21 to 26, the zoom lever 70 includes a base portion 78 and an operating convex portion 80.

The base portion 78 has a half-cylindrical wall portion 78A and end-face walls 78B provided at both ends of the half-cylindrical wall portion 78A in the width direction of the half-cylindrical wall portion 78A.

As shown in FIGS. 22 and 26, a space S is provided between the half-cylindrical wall portion 78A and the end-face walls 78B at the both ends. As shown in FIGS. 21 and 26, support axis insertion holes 78C are coaxially formed in the end-face walls 78B at the both ends.

As shown in FIG. 20, the zoom lever 70 is provided at the corner portion 76 with the axis centers of the support axis insertion holes 78C facing in the forward/rearward direction.

A support axis 82 which has an axis center extending in the forward/rearward direction of the housing 12 is inserted through the support axis insertion holes 78C. Both ends of the support axis 82 are supported by the sides of the housing 12. The zoom lever 70 is supported by the support axis 82 so as to be swingable around the axis center extending in the forward/rearward direction of the housing 12.

Moreover, as shown in FIGS. 21 to 24, a first pressing portion 78D and a second pressing portion 78E are provided at both ends of the half-cylindrical wall portion 78A in the extending direction of the half-cylindrical wall portion 78A. More particularly, as shown in FIG. 20, the first pressing portion 78D is provided at an end portion of the half-cylindrical wall portion 78A in the extending direction which is located at a lower position in the condition where the zoom lever 70 is installed, and the second portion 78E is provided at an end portion of the half-cylindrical wall portion 78A in the extending direction which is located at an upper position in the condition where the zoom lever 70 is installed.

As shown in FIG. 20, the operating convex portion 80 is a portion that is provided so as to project from the base portion 78 and is to be operated by a finger. The operating convex portion 80 is received in the cutout portion 7220.

More particularly, the operating convex portion 80 is provided so as to project from a center portion of the half-cylindrical wall portion 78A, a portion of the operating convex portion 80 which projects from the cutout portion 7220 includes a top surface region 80A continuing to the top surface 18, and a side surface region 80B continuing to the side surface 22. The top surface region 80A and the side surface region 80B are formed as a rugged region 8002 in order that the operating convex portion 80 is easy to be swingingly operated.

Moreover, as shown in FIGS. 17 and 18, at portions of the interior of the housing 12 which are opposed to the base portion 78, there are provided a first electrical contact piece 84A causing the actuator to perform a zooming action to the telescope side (first action) and a second electrical contact piece 84B causing the actuator to perform a zooming action to the wide angle side (second action). The first and second electrical contact pieces 84A, 84B are supported to the chassis 74. Namely, the first and second electrical contact pieces 84A, 84B are turned on or off, to thereby supply to the control section 36E (FIG. 7) an operation signal for causing the zooming action to be performed.

Then, at a first swing position of the zoom lever 70 at which the zoom lever 70 is swung downward, the first pressing portion 78D is adapted to press the first electrical contact piece 84A and, at a second swing position of the zoom lever 70 at which the zoom lever 70 is swung upward, the second pressing portion 78E is adapted to press the second electrical contact piece 84B.

The first and second electrical contact pieces 84A, 84B are configured to include thin leaf springs (resilient metal dome-shaped plates) which are formed into dome-shapes. The thin leaf springs are pressed in their thickness directions (in height directions) by the first and second pressing portions 78D, 78E and then deformed, whereby the first and second electrical contact pieces 84A, 84B are adapted to provide click feeling.

Moreover, as shown in FIG. 20, at a middle position of the zoom lever 70, the first and second electrical contact pieces 84A, 84B and the first and second pressing portions 78D, 78E are adapted to spaced apart from one another.

At the middle position of the zoom lever 70, the first and second electrical contact pieces 84A, 84B and the first and second pressing portions 78D, 78E are adapted to be spaced apart from one another in this way, so that even if any force is applied to the zoom lever 70 at the middle position by, for example, striking of any object against the zoom lever, application of large external force to the first and second electrical contact pieces 84A, 84B from the first and second pressing portions 78D, 78E is avoided, which realizes improvements in shock resistance property and durability of the first and second electrical contact pieces 84A, 84B.

The top surface 18 and the left side surface 22 which form the corner portion 76 intersect each other. A condition where the operating convex portion 80 is located 45 degrees with respect to both the top surface 18 and the left side surface 22 becomes the middle position of the zoom lever 70.

Incidentally, in lieu of the first and second electrical contact pieces 84A, 84B, for example, a volume (variable resistor) may be employed. In this case, a brush of the volume is moved by the swinging movement of the zoom lever 70 to thereby change the resistance value of the volume, switching of the zooming action toward the telescope side or the wide angle side may be performed and a speed of the zooming action may be controlled, on the basis of the change in the resistance value.

As shown in FIG. 19, a torsion spring 86 is wound around a portion of the support axis 82 arranged in the space S, and engagingly stopped at both ends thereof by the sides of the housing 12. By this torsion spring 86, the zoom lever 70 is typically urged toward the middle position. Incidentally, as the spring which urges the zoom lever 70 toward the middle position, there may be employed a leaf spring, for example. Moreover, as the structure of the spring itself and the arranging structure of the spring, there may be employed various structures which are known in the past.

(Operating Process of the Zoom Lever 70)

Next, an operating process of the imaging apparatus 10 at the time of a photographing operation will be discussed.

The barrier 40 shall be previously located at the opening position P2.

The user holds the housing 12 with the thumb of his/her right hand being laid onto the left side portion of the rear surface 16, with the middle finger and medical finger of the right hand being laid onto a left side portion of a front surface of the barrier opening/closing member 42, and with the little finger of the right hand being laid onto a left side portion of the bottom surface 20.

Then, the user causes the imaging optical system 26 to be directed to the subject while viewing an image displayed on the display 32, and causes the operating convex portion 80 to be swung with the fingertip of the forefinger, to thereby cause the zoom lever 70 to be swung to the first swing position or the second swing position, whereby the zooming action of the zoom mechanism 90 is performed and the zoom ratio of the imaging optical system 26 is set to a desired zoom ratio.

When the desired zoom ratio is obtained, the user removes the fingertip of the forefinger from the operating convex portion 80 onto the shutter button 30B and presses down the shutter button 30B to thereby photograph the subject.

According to the above-mentioned structure, the zoom lever 70 is provided at the corner portion 76, at which the top surface 18 and side surface 22 of the housing 12 intersect each other, so as to be swingable about the axis center extending in the forward/rearward direction of the housing 12.

Therefore, the housing 12 is allowed to be small-sized, so that even if the rear surface 16 of the housing 12 is occupied by the display 32 and a space for allowing a zoom switch therein is hard to be obtained on the rear surface 16, the zoom lever 70 can be arranged at the housing 12, which, of course, becomes advantageous in realizing the reduction in the dimensions of the housing 12, and also becomes advantageous in realizing an improvement in the operability of the imaging apparatus 10 since the user can firmly hold the housing 12 while operating the zoom lever 70 and can easily operate the zoom lever 70 with the tip of the finger holding the side portion of the housing 12.

Particularly, the zoom lever 70 which is provided at the corner portion 76 is adapted to be swung around the axis center extending in the forward/rearward direction of the housing 12, so that force exerted on the housing 12 by the operation of the zoom lever 70 is slight, which becomes advantageous in enhancing the hold characteristic of the housing 12 and also becomes advantages in realizing the improvement of the operability.

Moreover, in a case where both of the zoom switch and the shutter button are adapted to be acted by pressing operation, if the zoom switch is provided in close proximity to the shutter button, there is a possibility that one of them will be mistaken for the other of them and erroneously operated. On the contrary, in this embodiment, the zoom lever 70 is adapted to be acted by the swinging operation and the shutter button 30B is adapted to be acted by the pressing operation, so that even if the zoom lever 70 is provided in close proximity to the shutter button 30B, one of them can be effectively prevented from being mistaken for the other of them and being erroneously operated, which becomes advantageous in realizing the improvement of the operability.

Moreover, the zoom lever 70 is provided so as to be arranged at the corner portion 76 that is a dead space of the housing 12, so that it is possible to considerably obtain a swing radius (measured from the axis center to a tip end of the operating convex portion 80) of the zoom lever 70 about the axis center of the zoom lever 70 while effectively utilizing the dead space of the housing 12, which becomes advantageous in realizing the improvement in the operability of the zoom lever 70.

Incidentally, while the case where the actuator drives the zoom mechanism 90 has been discussed above, the actuator is widely applied to a case where it drives the focus mechanism, the barrier opening/closing mechanism, etc. other than the zoom mechanism 90.

It should be understood by those skilled in the art that various modification, combinations, sub-combinations and alternations may occur depending on design requirements and other factors insofar as they are within the scope of the appended claims or the equivalents thereof.

What is claimed is:

1. An imaging apparatus comprising:
a housing forming an external armor;
an imaging lens provided in the housing;
a barrier adapted to be moved between a closing position at which it covers the imaging lens, and an opening position at which it causes the imaging lens to be exposed;
a barrier opening/closing member provided at the housing so as to be movable between a first position and a second position; and
an interlock mechanism coupling the barrier and the barrier opening/closing member, causing the barrier to be located at the closing position at the first position of the barrier opening/closing member, and causing the barrier to be located at the opening position at the second position,
the barrier being provided between the housing and the barrier opening/closing member and covered, at the opening position, with the barrier opening/closing member located at the second position,
in which each of the barrier opening/closing member and the barrier has a respective width over a total length of a front surface of the housing in a left/right direction and a respective height less than a vertical height of the front surface of the housing.

2. An imaging apparatus according to claim 1,
wherein: the barrier is supported to the housing so as to be movable between the closing position and the opening position; and
the barrier opening/closing member is supported to the housing so as to be movable between the first position and the second position.

3. An imaging apparatus according to claim 1,
wherein: the interlock mechanism includes a portion supported by the housing and an arm swingable as a fulcrum;
the barrier and the barrier opening/closing member are coupled to the arm;
a connected portion between the arm and the barrier is located at a position far separate from the fulcrum as compared to a connected portion between the arm and the barrier opening/closing member; and
the barrier is moved through the arm between the closing position and the opening position with a distance larger than a distance between the first position and the second position, by the movement of the barrier opening/closing member.

4. An imaging apparatus according to claim 1,
wherein: the housing exhibits a flat plate shape having a thickness thin in a forward/rearward direction;
the imaging lens is provided in an upper portion of the front surface of the housing;
the barrier opening/closing member and the barrier both exhibit flat plate shapes and are provided on the front surface of the housing; and
the barrier is exposed in the upward direction of the barrier opening/closing member in a condition where the barrier opening/closing member is located at the first position and the barrier is located at the closing position.

5. An imaging apparatus according to claim 4,
wherein: the barrier opening/closing member and the barrier both exhibit long and thin shapes extending in the left/right direction; and
the first position is a portion at which the barrier opening/closing member is located at a center in the height direction of the front surface.

6. An imaging apparatus according to claim 4,
wherein: the barrier opening/closing member and the barrier both exhibit long and thin shapes extending in the left/right direction;
the first position is a portion at which the barrier opening/closing member is located at a center in the height direction of the front surface; and
the imaging apparatus has a front surface, the front surface of the imaging apparatus being formed by the barrier, the barrier opening/closing member, and the front surface portion of the housing which is exposed in the downward direction of the barrier opening/closing member, in a condition where the barrier opening/closing member is located at the first position and the barrier is located at the closing position,
the front surface of the imaging apparatus being formed by the barrier opening/closing member and front surface portions of the housing which are exposed in the upward and downward directions of the barrier opening/closing member, in a condition where the barrier opening/closing member is located at the second position and the barrier is located at the opening position.

* * * * *